US006660452B2

United States Patent
Iwasaki et al.

(10) Patent No.: US 6,660,452 B2
(45) Date of Patent: Dec. 9, 2003

(54) OPTICAL INFORMATION MEMORY MEDIUM AND DISPLAY RECORDING METHOD USING THE SAME

(75) Inventors: Hiroko Iwasaki, Tokyo (JP); Kenichi Aihara, Shizuoka (JP); Kyohji Hattori, Shizuoka (JP); Akihiko Okamoto, Kanagawa (JP); Yoshihiko Hotta, Shizuoka (JP); Naoshi Mishima, Shizuoka (JP); Tetsuo Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/085,257

(22) Filed: Feb. 26, 2002

(65) Prior Publication Data

US 2002/0142236 A1 Oct. 3, 2002

Related U.S. Application Data

(63) Continuation of application No. 09/209,660, filed on Dec. 10, 1998, now abandoned.

(30) Foreign Application Priority Data

Dec. 12, 1997 (JP) .............................................. 9-362864
Jul. 28, 1998 (JP) ............................................ 10-213227

(51) Int. Cl.$^7$ ................................................ G11B 7/24
(52) U.S. Cl. .................... 430/270.13; 430/945; 430/19; 503/200
(58) Field of Search ................................ 430/200, 201, 430/945, 270.11, 270.13, 19; 503/227, 200

(56) References Cited

U.S. PATENT DOCUMENTS

| | | | |
|---|---|---|---|
| 5,011,723 A | 4/1991 | Harigaya et al. ............ 430/945 |
| 5,024,927 A | 6/1991 | Yamada et al. ............. 430/945 |
| 5,080,947 A | 1/1992 | Yamada et al. ............. 428/913 |
| 5,100,700 A | 3/1992 | Ide et al. .................... 428/913 |
| 5,156,693 A | 10/1992 | Ide et al. .................. 346/135.1 |
| 5,504,321 A | * 4/1996 | Sheldon ........................ 235/492 |
| 5,555,537 A | * 9/1996 | Imaino et al. ............ 369/275.4 |
| 5,616,447 A | * 4/1997 | Arioka .................... 430/270.11 |
| 5,643,851 A | * 7/1997 | Konagaya et al. .......... 502/201 |
| 5,657,303 A | * 8/1997 | Namoto et al. ............. 369/100 |
| 5,695,866 A | * 12/1997 | Watanabe et al. ........... 428/913 |
| 5,719,850 A | * 2/1998 | Yoshioka et al. ........... 369/283 |
| 5,736,657 A | 4/1998 | Ide et al. ...................... 75/230 |
| 5,768,221 A | * 6/1998 | Kasami et al. ................ 369/14 |
| 5,785,828 A | 7/1998 | Yamada et al. ........ 204/298.13 |
| 5,894,069 A | * 4/1999 | Wen et al. ................... 430/945 |
| 5,944,945 A | * 8/1999 | Shinohe et al. ............. 156/538 |
| 5,948,727 A | * 9/1999 | Hotta et al. ................. 503/200 |
| 6,221,557 B1 | 4/2001 | Harigaya et al. ...... 430/270.13 |

FOREIGN PATENT DOCUMENTS

| | | | |
|---|---|---|---|
| EP | 0422774 | | 4/1991 |
| EP | 0764548 | * | 3/1997 |
| JP | 02-057396 | * | 2/1990 |
| JP | 02-192999 | * | 7/1990 |
| JP | 6055887 | | 1/1994 |
| JP | 8096557 | | 4/1996 |
| JP | 08-118819 | * | 5/1996 |
| JP | 09-188332 | * | 7/1997 |
| JP | 10-217611 | * | 8/1998 |
| JP | 10-217619 | * | 8/1998 |

* cited by examiner

Primary Examiner—Martin Angebranndt
(74) Attorney, Agent, or Firm—Cooper & Dunham LLP

(57) ABSTRACT

An optical information memory medium, including, in the stated order a substrate, an optical information memory layer which is capable of memorizing information therein, and a reversible display recording layer which is capable of rewritably recording therein, in a visibly recognizable form, at least part of an information corresponding to the information memorized in the optical information memory layer, and a display recording method using the optical information memory medium are disclosed.

75 Claims, 7 Drawing Sheets

OPTICAL INFORMATION MEMORY MEDIUM AND DISPLAY RECORDING METHOD USING THE SAME

CROSS REFERENCE TO RELATED APPLICATION

This application is a continuation of applicants' U.S. patent application Ser. No. 09/209,660 filed Dec. 10, 1998, now abandoned.

BACKGROUND OF THE INVENTION

1. Field of the Invention

The present invention relates to an optical information memory medium which is capable of reversibly displaying at least part of information recorded in the optical information memory medium, and also to a display recording method.

2. Discussion of Background

Recently the importance of electronic information memory media for storing, recording and rewriting huge amounts of information is increasing year by year as peripheral devices not only for office use, but also in home use.

Examples of such electronic information memory media include magnetic tape, floppy disk, magneto-optical disk, compact disks(CD) such as CD-DA, CD-ROM, CD-R and CD-RW, DVD-type media such as DVD-ROM, DVD-R and DVD-RAM, integrated circuit (IC) card, optical card, and removal hard disk. Recently memory capacity, and kinds and number of information to be recorded for one medium are significantly increasing. Of these recording media, particular attention is paid to optical information memory media which are capable of storing information and from which recorded information can be read, with the application of laser beams thereto.

As a conventional index recording method for recording the contents, volumes and titles of information recorded in such electronic information memory media and for easily recognizing them visually, a method of applying a self-adhesive index label indicating such information to disk cartridges is employed. More specifically, Japanese Laid-Open Patent Application No. 9-282836 proposes a liquid crystal/polymer composite film to be used as such an index label, which is capable of rewriting displayed information.

However, in the case of compact disks, no cartridges are used, but the media are used alone, so that there is a problem that if the above-mentioned liquid crystal/polymer composite film is provided on the surface of the disk, the disk becomes too thick as a whole to be used in rotation for reading recorded information or for writing information therein by the application of laser beams thereto.

In the case of CD-ROMs, some data is already recorded therein when produced so that CD-ROMs are used exclusively for reproduction. In such CD-ROMs, index displays indicating the contents of recorded information and various designs are printed on the surface of a protective layer therefor, using an ultraviolet-curing ink or an oil ink. Such printing is usually carried out by screen printing or offset printing, which is suitable for performing multiple printing for printing a number of the same patterns at the same.

Write-once type optical information memory media (CD-R), which are capable of recording information once therein and reproducing the recorded information using a CD player, have now been developed, so that end-users themselves may record their own information such as music or computer data in the CD-R. The CD-R does not bear anything on the surface thereof or merely bears only printed general characters or patterns, using an ultraviolet-curing ink or an oil ink, so that the user may write his or her notes regarding recorded personal information on the surface of a protective layer for the CD-R, using a felt pen, or apply an index display label indicating his or her notes to the surface of the protective layer, or perform display recording by an ink jet printing method on an ink-receiving layer provided on the CD-R as proposed in Japanese Laid-Open Patent Application No-5-238005, or perform display recording by a sublimation type thermal image transfer recording method on a dye-receiving layer provided on the CD-R as proposed in Japanese Laid-Open Patent Application No. 8-48080.

Furthermore, rewritable optical information memory media (CD-RW) in which recorded information can be rewritten by the application of laser beams thereto have now been developed. In the case of the CD-RW, however, once the user write his or her notes regarding recorded personal information on the surface of the protective layer for the CD-RW, using a felt pen, or applies an index display label indicating his or her notes to the surface of the protective layer, for instance, using a thermal image transfer recording method, even if the recorded information is rewritten, it is not always easy to rewrite the notes or change the index display label, without damaging the CD-RW.

SUMMARY OF THE INVENTION

It is therefore a first object of the present invention to provide an optical information memory medium free of the above-mentioned shortcomings of the conventional optical information memory media, provided with a reversible display function of making it possible to make visual confirmation of the contents of information recorded in the medium by displaying the same, and also to record, erase and rewrite the display easily and neatly without making any damage to the optical information memory medium.

A second object of the present invention is to provide a display recording method, using the above-mentioned optical information memory medium.

The first object of the present invention can be achieved an optical information memory medium, comprising, in the stated order:

(a) a substrate, (b) an optical information memory layer which is capable of memorizing information therein, and (c) a reversible display recording layer which is capable of rewritably recording therein, in a visibly recognizable form, at least part of an information corresponding to said information memorized in the optical information memory layer.

In the above-mentioned optical information memory medium, the reversible display recording layer may be a reversible thermosensitive display recording layer of which transparency or color tone thereof is thermally reversibly changeable.

In the above optical information memory medium, the substrate may comprise a resin having a glass transition temperature Tg(° C.), and the reversible thermosensitive display recording layer may have a recording temperature Tr(° C.), with the glass transition temperature Tg(° C.) and the recording temperature Tr(° C.) being a relationship of:

$$Tr \leq 1.6 \times Tg \tag{1}$$

Furthermore, in the above optical information memory medium, the substrate may comprise a resin having a glass transition temperature Tg(° C.), and the reversible thermosensitive display recording layer may have a recording temperature Tr (° C.) and a thickness Lr (μm), and the distance between (a) a surface of the substrate on the side of the reversible thermosensitive display recording layer and (b) a surface of the reversible thermosensitive display recording layer on the side of the substrate is Ld (μm), with the glass transition temperature(° C.) of the resin, the recording temperature Tr(° C.) and the thickness Lr(μm) of the reversible thermosensitive display recording layer, and the distance Ld (μm) being a relationship of:

$$Tr \leq 1.3 \times Tg \times \frac{Lr + Ld}{Lr + 0.8 \times Ld} \quad (2)$$

In the above optical information memory medium, the recording temperature Tr of the reversible thermosensitive display recording layer may be 120° C. or more.

In the optical information memory medium, the reversible thermosensitive display layer may comprise a matrix resin and an organic low-molecular-weight material dispersed in the matrix resin, and may have a transparency which is reversibly changeable with the application of heat thereto.

In the above optical information memory medium, the organic low-molecular-weight material may comprise as at least part of the organic low-molecular-weight material an organic low-molecular-weight component with a melting point of 100° C. or more, but not more than 1.6 times the glass transition temperature of the resin of the substrate.

In the above optical information memory medium, the organic low-molecular-weight material may also comprise at least two organic low-molecular-weight components with different melting points with a difference of at least 30° C.

In the optical information memory medium of the present invention, the reversible thermosensitive display recording layer may comprise an electron-donating coloring material and an electron-accepting material capable of inducing color formation in the electron-donating coloring material by a coloring reaction between the electron-donating coloring material and the electron-accepting material, and the electron-accepting material may comprise at least as part of the electron-accepting material an electron-accepting compound with a melting point of 120° C. or more, but not more than 1.6 times the glass transition temperature of the resin of the substrate.

In the above-mentioned optical information memory media of the present invention, the resin of the substrate may have a glass transition temperature Tg of 100° C. or more.

Furthermore, in the above-mentioned optical information memory media of the present invention, the resin of the substrate may have a glass transition temperature Tg of 180° C. or less.

It is preferable that the optical information memory media of the present invention have a warping angle of ±0.6 deg or less and a warpage of 0.4 mm or less.

The optical information memory media of the present invention may further comprise a support for supporting thereon the reversible display recording layer and an adhesive layer or a tacky layer provided on a back side of the support opposite to the reversible display recording layer for fixing the reversible display recording layer supported on the support to the optical information memory layer, thus the adhesive layer or the tacky layer, the support and the reversible display recording layer constituting a reversible display recording label, so that the reversible display recording label can be applied to the optical information memory layer through the adhesive layer or the tacky layer.

In the above optical information memory media of the present invention, the information recorded in the reversible display recording layer in the visibly recognizable form may be in the form of a bar code.

Furthermore, the optical information memory media of the present invention may further comprise a light reflection layer for improving a display contrast of the reversible display recording layer which is provided behind the reversible display recording layer.

The optical information memory media of the present invention may further comprise a light reflection and heat dissipation layer for reflecting laser beams thereby and preventing the optical information memory layer from being heated, which light reflection and heat dissipation layer is provided between the optical information memory layer and the reversible display recording layer, nearer the optical information memory layer.

In the above optical information memory media of the present invention, the light reflection and heat dissipation layer can also serve as a light reflection layer for improving a display contrast of the reversible display recording layer, which is provided behind the reversible display recording layer.

In the optical information memory media of the present invention, it is preferable that a top surface of the optical information memory media on the side of the reversible display recording layer have a Ten-Point Mean Roughness (Rz) in a range of 0.3 to 3.0 μm (JIS B0601).

In the optical information memory media of the present invention, it is also preferable that a top surface of the optical information memory media on the side of the reversible display recording layer have a Center-line Mean Roughness (Ra) in a range of 0.05 to 1.0 μm (JIS B0601).

The optical information memory media of the present invention may further comprise a reversible display recording area on part of a surface of the substrate on the side of the optical information memory layer, and also an irreversible display recording area on the same surface as that of the surface of the substrate.

In the above optical information memory media of the present invention, the irreversible display recording area may be a hydrophilic surface to which a water base ink can be fixed.

Alternatively, in the above optical information memory media of the present invention, the irreversible display recording area may comprise an image receiving layer to which images formed by a thermal image transfer recording method can be fixed.

The second object of the present invention can be achieved by a display recording method, using any of the above-mentioned optical information memory media of the present invention, comprising the steps of:

memorizing and/or rewriting information that can be optically read by applying a laser beam thereto in the optical information memory layer, and recording and/or rewriting at least part of the memorized and/or recorded information in the reversible display recording layer in a visibly recognizable form.

In the above display recording method of the present invention, the reversible display recording layer may be a reversible thermosensitive display recording layer with a transparency or a color tone thereof being thermally changeable, and at least part of the information memorized and/or recorded information in the optical information memory layer can be recorded and/or rewritten in the reversible thermosensitive display recording layer with the application of heat thereto in the visibly recognizable form.

In the above display recording method, at least part of the information memorized and/or recorded information in the optical information memory layer can be recorded and/or rewritten in the reversible thermosensitive display recording layer, with the application of heat thereto at a temperature which is 1.6 times or less a glass transition temperature of the resin of the substrate, in the visibly recognizable form.

Furthermore, in the above display recording method of the present invention, at least part of the information memorized and/or recorded information in the optical information memory layer can be recorded and/or rewritten in the reversible thermosensitive display recording layer in the visibly recognizable form, with the application of heat thereto at a temperature corresponding to at least a temperature obtained by multiplying a glass transition temperature of the resin of the substrate by the following:

$$\frac{1.3 \times (Lr + Ld)}{Lr + 0.8 \times Ld}$$

wherein Lr is the thickness ($\mu$m) of the reversible thermosensitive display recording layer, and Ld is a distance ($\mu$m) between (a) a surface of the substrate on the side of the reversible thermosensitive display recording layer and (b) a surface of the reversible thermosensitive display recording layer on the side of the substrate.

Furthermore, the optical information memory medium for use in the display recording method may further comprise a reversible display recording area on part of a surface of the substrate on the side of the optical information memory layer, and also an irreversible display recording area on the same surface as that of the surface of the substrate. In this case, the above display recording method of the present invention further comprises a step of depositing imagewise a material comprising a dye or a pigment on the irreversible display recording area.

In the above optical information memory medium, the irreversible display recording area may be a hydrophilic surface. In this case, as the material comprising a dye or a pigment, a water base ink may be used and may be deposited imagewise on the irreversible display recording area by an ink jet printing method to form an image thereon.

In the above optical information memory medium, the water base ink may be deposited imagewise on the irreversible display recording area by an ink jet printing method to form an image thereon.

The material comprising a dye or a pigment can also be deposited imagewise on the irreversible display recording area by a thermal image transfer method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Other features of this invention will become apparent in the course of the following description of exemplary embodiments, which are given for illustration of the invention and are not intended to be limiting thereof.

As the optical information memory layer for use in the optical information memory medium of the present invention, any optical information memory layer can be employed as long as the optical information memory layer is capable of storing information, from which stored information can be optically read by the application of a laser beam thereto.

Specific examples of materials for use in the optical information memory layer are phase-change memory materials and magneto-optical memory materials. Of these materials, phase-change memory materials such as so-called chalcogen alloys are preferable. Examples of magneto-optical memory materials are FeTbCo based magneto-optical recording materials. Furthermore, GeSbTe and AgInSbTe based phase-change recording materials can be employed. Of these materials, AgInSbTe based phase-change recording materials are particularly preferable because of their excellent recording sensitivity and high erase ratio.

Figure 1:
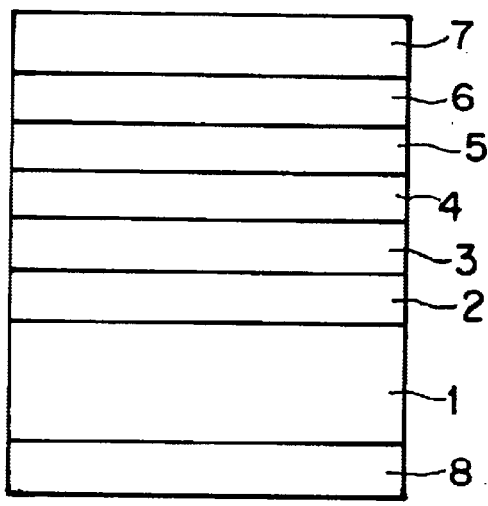
FIG. 1 is a schematic cross-sectional view of an example of an optical information memory medium of the present invention.

FIG. 1 is a schematic cross-sectional view of a representative example of an optical information memory medium of the present invention, in which an AgInSbTe based phase-change recording material is used. As shown in FIG. 1, a first dielectric layer 2, an optical information memory layer 3, a second dielectric layer 4, a light reflection and heat dissipation layer 5, and a reversible display recording layer 7 are successively overlaid on a substrate 1 with a guide groove (not shown). More preferably, an intermediate layer 6 may be provided between the light reflection and heat dissipation layer 5 and the reversible display recording layer 7, and a hard coat layer 8 may be provided on the back side of the substrate 1 as shown in FIG. 1. It is not always necessary to provide a pair of the first and second dielectric layers 2 and 4 between which the optical information memory layer 3 is to be interposed. However, when the substrate 1 is not highly heat resistant, for example, when the substrate 1 is made of polycarbonate resin, it is preferable to provide the first dielectric layer 2, which is heat resistant, as illustrated in FIG. 1.

It is preferable that the optical information memory layer 3 have a thickness of 5 to 100 nm, more preferably a thickness of 10 to 50 nm, furthermore preferably a thickness of 15 to 25 nm. The optical information memory layer can be prepared, for example, by sputtering, ion plating, vacuum deposition and plasma CVD (chemical vapor deposition).

Examples of the material for the substrate 1 are glass, ceramic materials and resins. Of the substrates made of any of these materials, a resin substrate is preferable from the viewpoints of molding easiness, manufacturing cost, and weight.

Examples of the resin as the material for the substrate 1 are polycarbonate resin, acrylic resin, epoxy resin, polystyrene resin, acrylonitrile-styrene copolymer resin, polyethylene resin, polypropylene resin, silicone resin, fluoroplastics, ABS resin and urethane resin. Of these resins, polycarbonate resin and acrylic resin are most preferable because of their workability, optical characteristics and heat resistant characteristics.

The substrate 1 may be prepared in the form of a disk, a card or a sheet, with any thickness, such as 1.2 mm, 0.6 mm or 0.3 mm. In view of crosstalk's tilt dependency of the substrate 1, the thinner the better. However, in view of the difficulty in producing a thin substrate and a production yield thereof, it is preferable that the thickness of the substrate 1 be approximately 1.2 mm or 0.6 mm.

In the case of the resin substrate, it is preferable that the resin for the resin substrate have a glass transition temperature (Tg) in the range of 100 to 200° C., more preferably in the range of 120 to 180° C. When the glass transition temperature (Tg) of the resin is lower than 100° C., the resin substrate tends to be easily deformed, while when the glass transition temperature (Tg) of the resin is higher than 200° C., the molding of the resin substrate tends to be difficult. The glass transition temperature (Tg) of the resin can be measured by a conventional method, for example, by measuring the dynamic viscoelasticity of the resin, or by DSC. In the measurement of the dynamic viscoelasticity, a peak temperature of tan δ or E" is considered to correspond to the glass transition temperature (Tg) of the resin.

As the materials for the first and second dielectric layers 2 and 4, for example, metallic oxides such as SiO, $SiO_2$, ZnO, $SnO_2$, $Al_2O_3$, $TiO_2$, $In_2O_3$, MgO, and $ZrO_2$; nitrides such as $Si_3N_4$, AlN, TiN, BN and ZrN; sulfides such as ZnS, $In_2S_3$ and $TaS_4$; carbides such as SiC, TaC, $B_4C$, WC, TiC and ZrC; carbon with a diamond structure; and mixtures thereof are preferable.

The first and second dielectric layers 2 and 4 can be formed, for example, by sputtering, ion plating, vacuum deposition or plasma CVD (chemical vapor deposition).

It is preferable that the first dielectric layer 2 have a thickness of 50 to 500 nm, more preferably a thickness of 100 to 300 nm, furthermore preferably a thickness of 150 to 250 nm. It is preferable that the second dielectric layer 4 have a thickness of 5 to 200 nm, more preferably a thickness of 10 to 50 nm.

As the materials for the light reflection and heat dissipation layer 5, there can be employed metallic materials such as Al, Ag and Au, and composite materials prepared by adding Ti, Cr, Si or Ti to the above-mentioned metallic material.

The light reflection and heat dissipation layer 5 can be formed, for example, by sputtering, ion plating, vacuum deposition or plasma CVD (chemical vapor deposition).

It is preferable that the light reflection and heat dissipation layer 5 have a thickness of 30 to 300 nm, more preferably a thickness of 50 to 250 nm, furthermore preferably a thickness of 70 to 200 nm.

The intermediate layer 6 may be provided when necessary as mentioned above. It is preferable that the intermediate layer 6 be made of a material comprising a resin as a main component. More specifically, it is preferable that the intermediate layer 6 be made of an ultraviolet-curing resin substantially made from an acrylic or methacrylic monomer.

The intermediate layer 6 can be formed by a coating method, such as spin coating, and has a function of protecting the optical information memory layer 3 and the light reflection and heat dissipation layer 5, and also a function of adhering the reversible display recording layer 7 to the light reflection and heat dissipation layer 5.

It is preferable that the intermediate layer 6 have a thickness of 0.5 to 20 μm, more preferably a thickness of 1.0 to 15 μm.

As the materials for the reversible display recording layer 7, there can be employed, for example, electrochromic materials, photochromic materials, thermochromic materials, magnetic materials, bistable liquid crystal materials, and thermosensitive recording materials. Of such materials, preferable are such materials that (1) assume a first state with a first transparency or a first color tone with the application of a predetermined amount of energy thereto, and assume a second state with a second transparency or a second color tone with the application of the same amount of energy as that of the first energy or a different amount of energy from that of the first energy, and (2) are capable of maintaining the first state and the second state without applying any energy thereto. Such energy can be applied thereto in the form of light, heat, electric field or magnetic field. The application of thermal energy or heat is preferable from the viewpoint of safety and cost.

It is preferable that the reversible display recording layer 7 have a thickness of 0.5 to 300 μm, more preferably a thickness of 1.0 to 100 μm, furthermore preferably a thickness of 2.0 to 30 μm.

As the materials for a reversible thermosensitive display recording layer serving as the reversible display recording layer 7, there can be employed any recording materials which are capable of reversibly changing the transparency or color tone thereof depending upon the temperature thereof. It is preferable that such materials are also capable of assuming two different states with a different color tone and/or a different transparency and maintaining such two different states at room temperature without the application of energy thereto.

Specific examples of such materials are (1) a reversible thermosensitive recording material comprising a mixture of two or more kinds of polymers, which is capable of assuming a transparent state and a milky white state, due to a difference in the compatibilized state of each of the mixed polymers as is disclosed in Japanese Laid-Open Patent Application 61-258853, (2) a phase-changeable liquid crystal polymer as is disclosed in Japanese Laid-Open Patent Application 62-66990, which utilizes the phase change of the liquid crystal polymer, and (3) recording materials capable of assuming a first color-developed state when heated to a first predetermined temperature which is above room temperature, and also assuming a second color-developed state when heated to a second predetermined temperature which is above the first temperature, and then cooled.

Furthermore, due to easy temperature control, there can be preferably employed such recording materials that are capable of assuming a first state with a first transparency, opaqueness or color when heated to a first predetermined temperature, and also assuming a second state with a second transparency, opaqueness or color which is different from the first transparency, opaqueness, or color, when heated to a second predetermined temperature which is above the first temperature.

Specific examples of such materials are (1) a recording material which comprises a resin and an organic long-chain low-molecular-weight material such as fatty acids dispersed in the resin and assumes a transparent state at a first predetermined temperature and a white opaque state at a second predetermined temperature as disclosed in Japanese Laid-Open Patent Application 55-154198; (2) a recording material which comprises a resin and a fatty acid and can assume a white opaque state at a first predetermined temperature and a transparent state at a second predetermined temperature, as disclosed in Japanese Laid-Open Patent Application 3-169590; (3) recording materials which comprise a coloring agent such as a leuco dye and a color developer comprising a long-chain alkyl group, and can assume a black, red or blue color at a second predetermined temperature, which color is decolorized at a first predetermined temperature, as disclosed in Japanese Laid-Open Patent Applications 5-124360, 5-29406 and 6-171225; and (4) recording materials which comprise a leuco dye and an ampholytic color developer and can assume a predetermined color at a first predetermined temperature, which predetermined color is decolorized at a second predetermined temperature, as disclosed in Japanese Laid-Open Patent Applications 2-188293 and 2-188294.

Of the above-mentioned recording materials, those employing the leuco dyes, capable of assuming a black, red or blue color, are preferably employed due to the capability of producing excellent contrast. Further, of the recording materials employing the leuco dyes, those employing the long-chain alkyl color developers are more preferably employed because the temperature control for the coloring and decolorization is easier. In the recording materials which comprise a resin and an organic low-molecular-weight material, such as a fatty acid, dispersed in the resin, and can assume a transparent state at a first predetermined temperature and a white opaque state after heated to a second predetermined temperature, the changes in the state are of physical changes, in contrast to the chemical changes in the recording materials using the leuco dyes, so that the recording materials comprising a resin and an organic low-molecular-weight material have higher preservation stability, sensitivity and durability than those of the recording materials using the leuco dyes, and are therefore furthermore preferably employed.

A reversible thermosensitive display recording material which comprises as the main components a matrix resin and an organic low-molecular-weight material dispersed in the matrix resin and assumes a transparent state when heated to a first predetermined temperature, and a white opaque state when heated to a second predetermined temperature will now be specifically explained.

This reversible thermosensitive display recording material utilizes the changes in transparency, producing a transparent state and a white opaque state, for displaying information.

The difference between the transparent state and the white opaque state of the reversible thermosensitive display recording layer is considered to be caused on the following principle:

(I) In the transparent state, finely-divided particles of the organic low-molecular-weight material are dispersed in the matrix resin in such a manner that the particles are in close contact with the matrix resin, without any gap therebetween and any void within the particles of the organic low-molecular-weight material. Therefore, light which enters the reversible thermosensitive display recording layer from one side thereof passes therethrough to an opposite side thereof, without being scattered. Thus, the reversible thermosensitive display recording layer appears transparent.

(ii) In the white opaque state, the particles of the organic low-molecular-weight material are composed of polycrystals consisting of numerous small crystals, so that there are gaps not only at the boundaries of the crystals, but also at the interfaces between the crystals and the matrix resin. Therefore, light which enters the reversible thermosensitive display recording layer is scattered at the interfaces between the gaps and the crystals, and also between the gaps and the resin, so that the reversible thermosensitive display recording layer appears white opaque.

Figure 2:
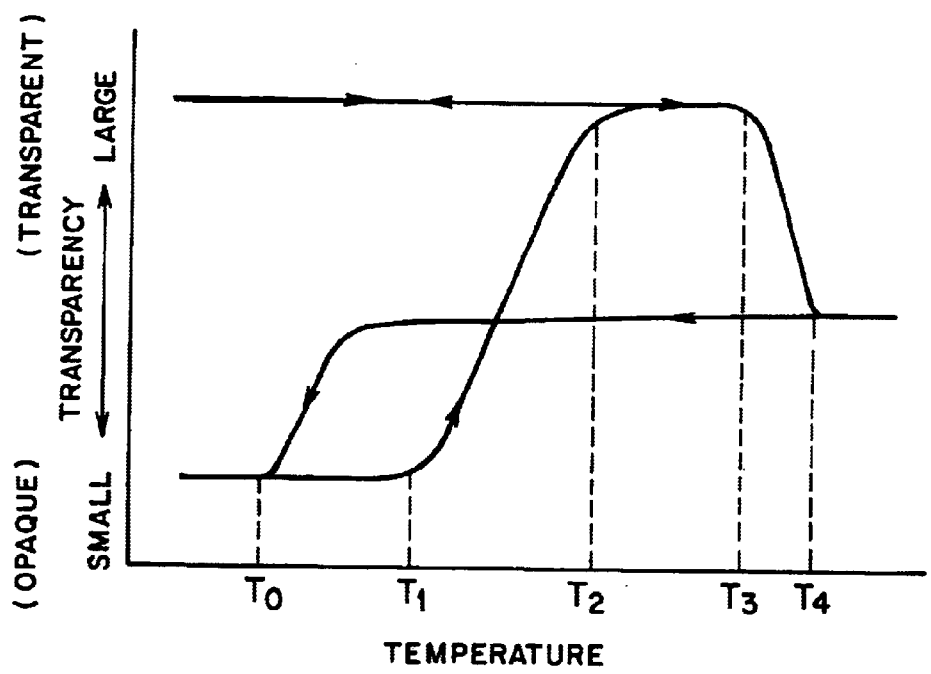
FIG. 2 is a diagram in explanation of the thermal changes in the transparency of a reversible thermosensitive display recording layer of an optical information memory medium of the present invention.

FIG. 2 is a diagram showing the changes in the transparency of the reversible thermosensitive display recording layer (hereinafter referred to as the display recording layer) which comprises as the main components a matrix resin and the particles of an organic low-molecular-weight material dispersed in the matrix resin under the application of heat thereto.

It is supposed that the display recording layer is in a white opaque state at room temperature, that is, a temperature $T_o$ or below, with a maximum opaqueness.

When the temperature of the display recording layer is raised by the application of heat thereto, the display recording layer gradually begins to become transparent at temperature $T_1$. The display recording layer assumes a completely transparent state when heated to a temperature in the range of $T_2$ to $T_3$, with a maximum transparency. Even when the temperature of the display recording layer in such a transparent state is decreased back to room temperature, or temperature $T_o$ or below, the transparent state is maintained at the maximum transparency. This is because when the temperature of the display recording layer is raised and reaches a temperature near $T_1$, the matrix resin begins to soften and is shrunk, so that the gaps at the interfaces between the matrix resin and the particles of the organic low-molecular-weight material, and the gaps within the particles of the low-molecular-weight material are decreased. As a result, the transparency of the recording layer gradually increases. When the temperature of the display recording layer reaches $T_2$ to $T_3$, the organic low-molecular-weight material is in a half-melted state, so that the remaining gaps are filled with the half-melted organic low-molecular-weight material. As a result, the display recording layer becomes transparent. The display recording layer in such a transparent state, however, still contains seed crystals of the organic low-molecular-weight material. Therefore, when the display recording layer in such a transparent state is cooled, the organic low-molecular-weight material containing the seed crystals crystallizes at a relatively high temperature. Even at the crystallization of the organic low-molecular-weight material, the matrix resin is still in a softened state, so that the matrix resin can compensate the changes in volume of the organic low-molecular-weight material caused by the crystallization, thereby forming no gaps therebetween. Thus, the transparent state is maintained.

When the recording layer maintained at a temperature in the range of $T_2$ to $T_3$ is further heated to a temperature $T_4$ or more, the display recording layer assumes a semi-transparent state with an intermediate transparency between the maximum transparent state and the maximum opaque state.

When the temperature of the display recording layer in such a semi-transparent state is decreased, the display recording layer assumes the initial white opaque state again, without assuming the transparent state during the cooling process.

This is because the organic low-molecular weight material is completely melted at the temperature $T_4$ or more, and thereafter, the organic low-molecular-weight material is supercooled and crystallizes out at a temperature slightly higher than the temperature $T_o$ in the course of the cooling step. It is considered that, in this case, the matrix resin cannot follow up the changes in volume of the organic low-molecular-weight material caused by the crystallization thereof, so that gaps are formed between the matrix resin and the organic low-molecular-weight material.

The temperature-transparency changes curve shown in FIG. 2 is a representative example. Depending on the kind of material used in the display recording layer, there may be some difference, for example, in the transparency at each state of the display recording layer.

It is preferable that the glass transitional temperature (Tg) of the resin for use in the display recording layer be in the range of 60° C. to 120° C., more preferably in the range of 70° C. to 100° C.

Specific examples of the resin for use in the display recording layer are polyvinyl chloride, and vinyl chloride copolymers such as vinyl chloride-vinyl acetate copolymer, vinyl chloride-vinyl acetate-vinyl alcohol copolymer, vinyl chloride vinyl acetate-maleic acid copolymer, vinyl chloride-acrylate copolymer; polyvinylidene chloride, and vinylidene chloride copolymers such as vinylidene chloride-vinyl chloride copolymer, and vinylidene chloride-acrylonitrile copolymer; polyester; polyamide; polyacrylate or polymethacrylate, or acrylate or methacrylate copolymers; silicone resin; polyethylene; polypropylene; polystyrene; polyacrylamide; polyvinyl pyrrolidone; natural rubber; polyvinyl alcohol; polyacrolein; polycarbonate. These resins can be employed alone or in combination.

Of the above-mentioned resins, polyvinyl chloride, and vinyl chloride copolymers such as vinyl chloride-vinyl acetate copolymer, vinyl chloride-vinyl acetate-vinyl alcohol copolymer, vinyl chloride-vinyl acetate maleic acid copolymer, vinyl chloride-acrylate copolymer are preferably employed.

It is preferable that the above resins for use in the display recording layer be cross-linked in order to improve the durability for repeated use thereof.

The cross-linking can be performed by heat application, UV (ultraviolet light) irradiation or EB (electron beam) irradiation. It is preferable that the cross-linking be carried out, using a variety of cross-linking agents. For example, thermal cross-linking can be performed in combination of a resin having hydroxyl groups such as vinyl chloride-vinyl acetate-vinyl alcohol copolymer and a material having an isocyanate group; and ultraviolet cross-linking and EB cross-linking of a resin can be performed in the presence of an acrylic or methacrylic monomer or an oligomer. The cross-linking methods are not limited to these methods.

Conventional resins to be cross-linked, cross-linking agents and cross-linking methods, which are described in Japanese Laid-Open Patent Applications 64-62368, 3-227688, 7-96679 and 7-172072, can be used in any conventional combination thereof.

As the organic low-molecular-weight material for use in the display recording layer of the present invention, any material can be employed as long as it can be made in the form of particles in the display recording layer, with a melting point in a range of 30° C. to 200° C., more preferably in a range of about 50° C. to 200° C. Furthermore, as the organic low-molecular-weight material for use in the display recording layer of the present invention, a long-chain hydrocarbon compound with at least one long-chain hydrocarbon moiety of 6 carbon atoms or more, more preferably 8 carbon atoms or more, furthermore preferably 10 carbon atoms or more, 50 carbon atoms or less, more preferably 40 carbon atoms or less, furthermore preferably 30 carbon atoms or less. The above-mentioned number of carbon atoms indicates a total of carbon atoms in the long-chain hydrocarbon compound and may be divided into two or more long-chain hydrocarbon moieties in one molecule of the long-chain hydrocarbon compound.

In the present invention, it is preferable to use as the organic low-molecular-weight material a composite material comprising an organic low-molecular-weight material having a low melting point and an organic low-molecular-weight material having a high melting point, preferably with a melting point difference of 30° C. or more, more preferably with a melting point difference of 40° C. or more, furthermore preferably with a melting point difference of 50° C. or more, between the high-melting point organic low-molecular-weight material and the low-melting point organic low-molecular-weight material.

By use of such a composite material as the organic low-molecular-weight material, the temperature range in which the display recording layer becomes transparent can be further increased.

It is preferable that the lower limit of the melting point of the low-melting point organic low-molecular-weight material be 50° C. or more, more preferably 70° C. or more, furthermore preferably 80° C. or more, and that the upper limit of the melting point of the low-melting point organic low-molecular-weight material be less than 100° C. The higher the melting point of the low-melting point organic low-molecular-weight material, the more improved the heat resistance of images obtained.

It is preferable that the lower limit of the melting point of the high-melting point organic low-molecular-weight material be 100° C. or more, more preferably 120° C. or more, furthermore preferably 130° C. or more, most preferably 140° C. or more, and that the upper limit of the melting point of the high-melting point organic low-molecular-weight material be 200° C. or less, more preferably 180° C. or less, furthermore preferably 170° C. or less. The higher the melting point of the high-melting point organic low-molecular-weight material, the greater the melting point difference between the high-melting point organic lowmolecular-weight material and the low-melting point organic low-molecular-weight material. The result is that the transparency range is increased, so that the processing speed is increased and the transparency process becomes easier. On the other hand, the lower the melting point of the high-melting point organic low-molecular-weight material, the greater the image formation sensitivity.

Specific examples of the low-melting point organic low-molecular-weight material are fatty acid ester, dibasic acid ester, difatty acid ester of polyhydric alcohol, higher-alkyl-group-containing ketone, fatty acid, alkyl amide and alkyl urea, but are not limited to these. These compounds may be used alone or in combination.

Specific examples of the high-melting point organic low-molecular-weight material are aliphatic saturated dicarboxylic acid, semicarbazone derived from higher-alkyl-group-containing ketone, α-phosphonofatty acid, fatty amide, aliphatic bisamide, alicyclic dicarboxylic acid, and steroid-skeleton-containing fatty acid, but are not limited to these compounds. These compounds may be used alone or in combination.

As the organic low-molecular-weight materials for use in the present invention, the conventional compounds disclosed in Japanese Laid-Open Patent Applications Nos. 2-1363, 3-2089, 5-77549, 5-96850, 5-124343, 5-294062, 6-48024 and 8-20167, and any and all conventional combinations thereof can be used in the present invention.

It is preferable that the mixing amount ratio by weight of the low-melting point organic low-molecular-weight material to the high-melting point organic low-molecular-weight material be in the range of (95:5) to (5:95), more preferably in the range of (90:10) to (10:90), and furthermore preferably in the range of (80:20) to (20:80).

It is preferable that the ratio by weight of the organic low-molecular-weight material to the matrix resin in the display recording layer be approximately in the range of about (2:1) to (1:16), more preferably in the range of (1:2) to (1:8), and furthermore preferably in the range of (1:2) to (1:4) in order to form a resin film in which the organic low-molecular-weight material is appropriately held and which is capable of becoming appropriately white opaque. In other words, when the amount of the resin is insufficient in view of the above-mentioned ranges, it is not always easy to form a resin film in which the organic low-molecular-weight material is appropriately held, when the amount of the resin is excessive in view of the above-mentioned ranges, it is not always easy to make the display recording layer opaque.

In addition to the above-mentioned components, additives such as a surfactant and a plasticizer may be added to the display recording layer in order to facilitate the formation of transparent images. Examples of such additives are disclosed in Japanese Laid-Open Patent Applications 63-104879 and 63-178079, but the additives for use in the present invention are not limited to the compounds disclosed therein.

A reversible thermosensitive display recording material for use in the display recording layer, which comprises a leuco dye and a long-chain alkyl color developer and is capable of inducing color formation in the leuco dye and decolorizing an induced color reversibly will now be explained in detail.

The leuco dye for use in the present invention can be selected from the group consisting of triphenylmethane phthalide compound, fluoran compound, phenothiazine compound, leuco auramine compound, and indolinophthalide compound.

The color developer is such a compound that has a structure capable of inducing color formation in the above-mentioned leuco dye, such as phenolic hydroxyl group, carboxylic group or phosphoric group, and a structure capable of controlling an intermolecular coagulation force, such as a long-chain hydrocarbon group, with the two structures being connected with each other. The two structures may be connected through a bivalent group containing a hetero-atom, or a bivalent aromatic group. Specific examples of such color developers are described, for instance, in Japanese Laid-Open Patent Application 5-124360.

It is preferable that the above-mentioned color developer have a melting point in the range of 120 to 200° C., more preferably in the range of 140 to 180° C.

Figure 3:
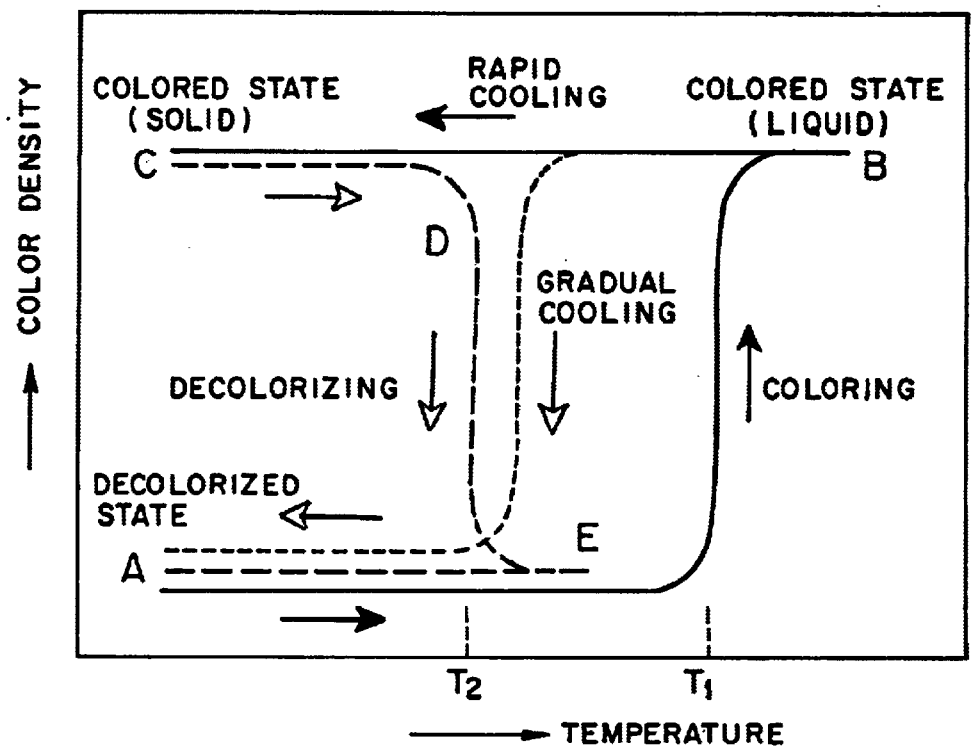
FIG. 3 is a diagram in explanation of the thermal changes in the color tone of a reversible thermosensitive display recording layer of an optical information memory medium of the present invention.

FIG. 3 is a diagram showing the relationship between the color developed density of the above-mentioned reversible thermosensitive display recording material comprising the leuco dye and the long-chain alkyl color developer (hereinafter referred to as the coloring composition) and the temperature thereof with the color developed density being plotted as ordinate and the temperature as abscissa.

When the coloring composition in a decolorized state (A) is heated, and the temperature of the coloring composition reaches temperature $T_1$, the coloring composition is fused and colored in a fused and colored state (B), taking the course as indicated by the solid line in the diagram. If the coloring composition in the fused and colored state (B) is rapidly cooled, the temperature of the coloring composition can be decreased down to room temperature to reach a solid colored state (C) with the colored state thereof being maintained as indicated by the solid line in the diagram. However, whether or not the solid colored state (C) can be obtained depends upon how fast the coloring composition in the fused and colored state (B) is cooled to room temperature, that is, upon the cooling speed at which the coloring composition is cooled from the fused and colored state (B) to room temperature. If the coloring composition in the fused and colored state (B) is gradually cooled, the coloring composition in the colored state (B) is decolorized in the course of the gradual cooling process to reach the initial decolorized state (A), taking the course as indicated by the broken line in the diagram, or to reach a state with a lower coloring density than that of the solid colored state (C) (not shown).

Furthermore, if the coloring composition in the solid colored state (C) is heated and when the temperature thereof reaches temperature $T_2$ which is lower than the coloring initiation temperature $T_1$, the coloring composition begins to be decolorized to reach a decolorized state (E), taking the course of C to D to E as indicated by the broken line. Even when the coloring composition in the decolorized state (E) is further cooled, the coloring composition returns to the initial decolorized state (A).

Figure 4:
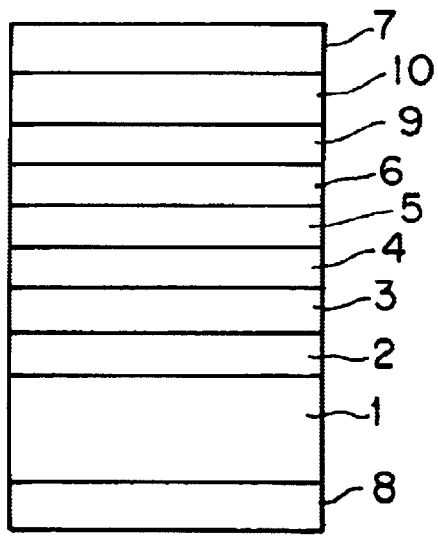
FIG. 4 is a schematic cross-sectional view of another example of an optical information memory medium of the present invention.

The reversible display recording layer can be provided integrally with a disk-shaped substrate and the optical information memory layer, for example, by the following methods:

(1) As illustrated in FIG. 4, the reversible display recording layer 7 is provided on a support 10, and an adhesive or tacky layer 9 is provided on the back side of the support 10, opposite to the reversible display recording layer 7, whereby a reversible display recording layer bearing adhesive label is prepared. This label is applied to the intermediate layer 6 as illustrated in FIG. 4.

Figure 5A:
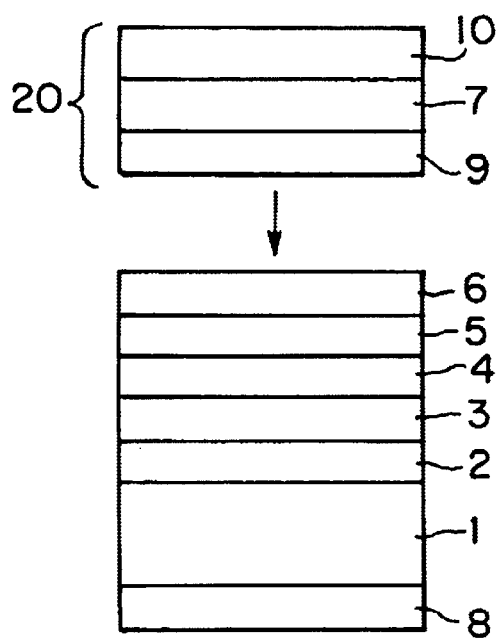
FIG. 5(a) and FIG. 5(b) are diagrams in explanation of the fabrication of an optical information memory medium of the present invention.

(2) As illustrated in FIG. 5(a), the reversible display recording layer 7 is provided on the support 10.

Figure 5B:
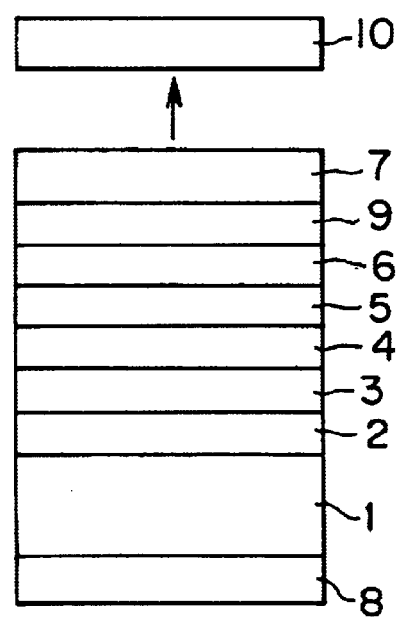

Optionally, the adhesive or tacky layer 9 is provided on the reversible display recording layer 7 to prepare a reversible display recording layer bearing label 20 is prepared as shown in FIG. 5(a). The adhesive or tacky layer 9 of the reversible display recording layer bearing label 20 is brought into contact with the intermediate layer 6 and applied thereto as illustrated in FIG. 5(a). The support 10 is then peeled away from the reversible display recording layer 7 of the reversible display recording layer bearing label 20, whereby the reversible display recording layer 7 is transferred, as illustrated in FIG. 5(b).

(3) A reversible display recording layer formation liquid is directly coated on the reversible display recording layer 7 (not shown).

The above-mentioned method using the reversible display recording layer bearing adhesive label has advantages over other methods that the support for the label has a heat insulating function, capable of hindering the heat transfer from the reversible display recording layer to the substrate, and that since a large area coating can be performed on the label, the label itself is inexpensive. It is preferable that the label have an adhesion force of 0.5 kgf/25 mm or more, more preferably an adhesive force of 1.0 kg/25 mm or more, in terms of an average value of tension load when measured at 180° peeling in accordance with JIS (the Japanese Industrial Standards) K-6854. When the adhesive force is insufficient, there will be caused a problem that the label is peeled off while in repeated use.

The above-mentioned method of transferring the reversible display recording layer 7, and the method of coating the reversible display recording layer formation liquid have an advantage over other methods that the optical information memory medium can be made thinner as a whole, and when the substrate is disk-shaped, the occurrence of non-uniform rotation of the disk can be minimized.

Figure 6A:
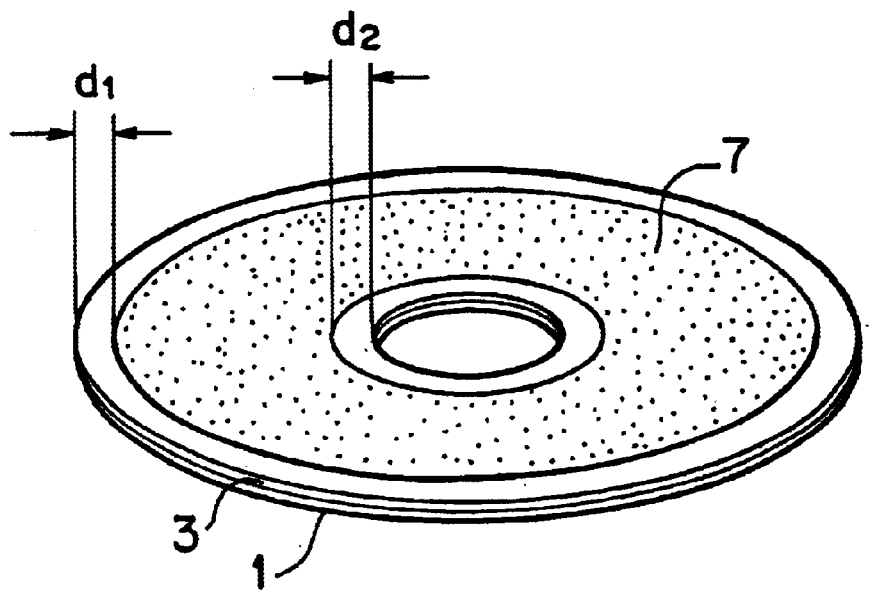
FIG. 6(a) and FIG. 6(b) are schematic perspective views of disk-shaped optical information memory media of the present invention in explanation of the positional relationship of a substrate and a reversible display recording area thereof.
Figure 6B:
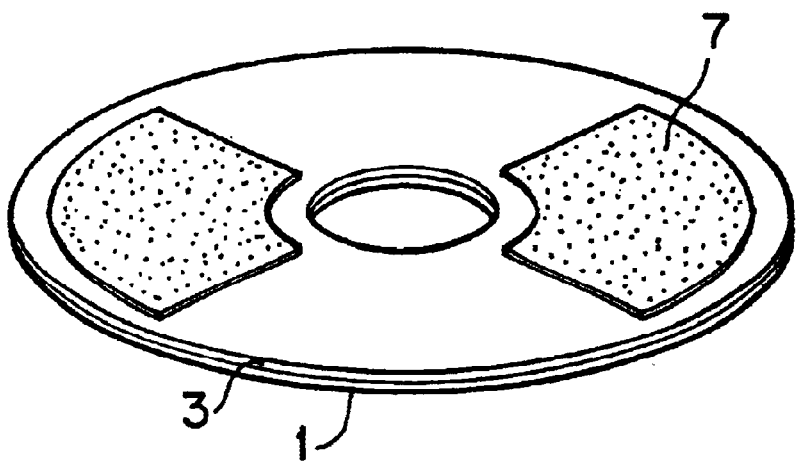

FIG. 6(a) and FIG. 6(b) show examples of optical information memory media fabricated using a disk-shaped substrate.

In the optical information memory medium shown in FIG. 6(a), a donut-shaped reversible display recording layer 7 is provided. It is preferable that the donut-shaped reversible display recording layer 7 be provided in such a position that is inside an outer peripheral portion of the disk-shaped substrate and also outside an inner peripheral portion of the disk-shaped substrate as illustrated in FIG. 6(a).

More specifically, in the optical information memory medium as shown in FIG. 6(a), it is preferable that an outer gap $d_1$ be 0.5 mm or more, more preferably 1.0 mm or more, and that an inner gap $d_2$ be 0.5 mm or more, more preferably 1.0 mm or more. The smaller the outer and inner gaps, the greater the risk that the reversible display recording layer is peeled away from the substrate.

In the case where the substrate is disk-shaped, it is not always necessary that the reversible display recording layer 7 be donut-shaped, but the reversible display recording layer 7 may be separated into two parts as illustrated in FIG. 6(b). However it is preferable that the separated parts of the reversible display recording layer 7 be positioned in a central symmetry with respect to the center point of the disk.

When the reversible display recording layer 7 is composed of a material of which transparency is reversibly changeable from a transparent state to a white opaque state advice versa, it is preferable to provide a light reflection layer behind the reversible display recording layer 7 in order to improve the image contrast thereof. Such alight reflection layer may be made so as to serve as a light reflective, dielectric layer as well, whereby the structure of the optical information memory medium can be simplified and accordingly the fabrication thereof can also be simplified.

With reference to FIG. 4, the above-mentioned light reflection layer may be interposed between the reversible display recording layer 7 and the support 10, or between the support 10 and the adhesive or tacky layer 9, and with reference to FIGS. 5(a) and 5(b), the light reflection layer may be interposed between the reversible display recording layer 7 and the adhesive or tacky layer 9, or between the adhesive or tacky layer 9 and the intermediate layer 6.

The light reflection layer can be formed, for example, by depositing in vacuum a metal such as Al, Ni or Sn.

Specific examples of materials for use in the adhesive layer or tacky layer are urea resin, melamine resin, phenolic resin, epoxy resin, polyvinyl acetate resin, vinyl acetate-acrylic copolymer, ethylene-vinyl acetate copolymer, acrylic resin, polyvinyl ether resin, vinyl chloride-vinyl acetate copolymer, polystyrene resin, polyester resin, polyurethane resin, polyamide resin, chlorinated polyolefin resin, polyvinyl butyral resin, acrylic ester copolymer, methacrylic ester copolymer, natural rubber, cyanoacrylate resin, silicone resin, but are not limited to these materials. The materials for use in the adhesive layer and the tacky layer may be of a hot-melt type. The reversible display recording label may be used either with a disposable release paper or without a disposable release paper.

As the support for the reversible display recording layer bearing adhesive label for transferring the reversible display recording layer, polyimide film, aramide film, polyphenyl-sulfide film, and polyester film can be employed, but the supports are not limited to these films.

It is preferable that the support have a thickness of 3 μm to 250 μm, more preferably 10 μm to 50 μm, furthermore preferably 20 μm to 100 μm.

It is preferable to provide a protective layer on the reversible display recording layer in order to protect the reversible display recording layer from mechanical stress.

When, for example, a thermal head is brought into contact with the surface of the reversible display recording layer and heat is applied thereto by the thermal head, it is required to protect the surface of the reversible display recording layer from both heat and mechanical stress. It is preferable that the protective layer have a thickness of 0.1 μm to 20 μm, more preferably a thickness of 0.5 μm to 10 μm.

It is also preferable that the protective layer be made of a resin, more preferably a cured resin such as a thermosetting resin, an ultraviolet curing resin, or an electron irradiation curing resin. Specific examples of the material for the protective layer are silicone rubber and silicone resin as proposed in Japanese Patent Application 63-221087, polysiloxane graft polymer as proposed in Japanese Patent Application 63-317385, and ultraviolet curing resin and electron irradiation curing resin as disclosed in Japanese Laid-Open Patent Application 2-566.

The protective layer is conventionally formed by printing or coating.

When the protective layer is formed by coating, using a solvent, it is preferable that the solvent be such a solvent that the resin and the organic low-molecular-weight material for the reversible display recording layer are not soluble or slightly soluble therein.

The protective layer may further comprise a lubricant for reducing a coefficient of friction of the surface thereof. In order to make the surface of the protective layer rough, an organic or inorganic filler may be added to the protective layer. In order to improve the adhesiveness of the protective layer, there can be provided a layer comprising a resin as the main component between the protective layer and the reversible display recording layer.

Figure 7:
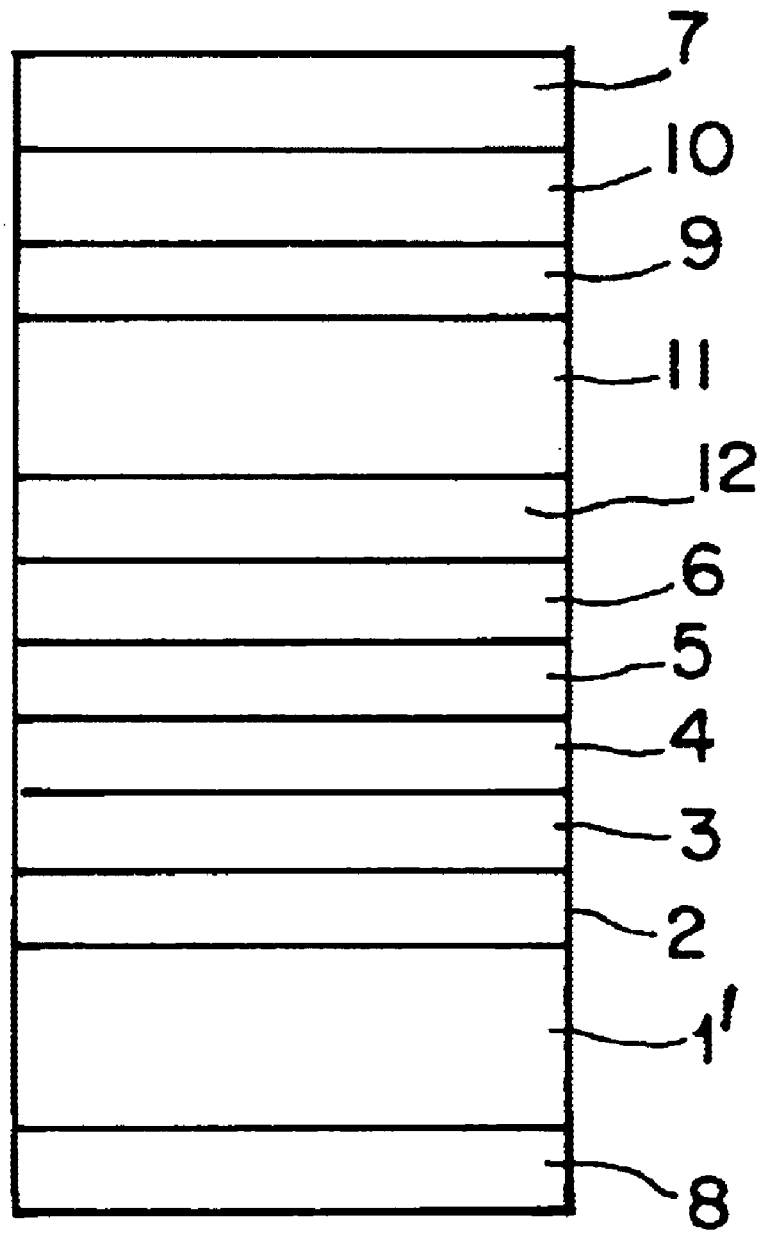
FIG. 7 is a schematic cross-sectional view of a further example of an optical information memory medium of the present invention.

In the present invention, as illustrated in FIG. 7, a pair of substrates, namely a first substrate 1' and a second substrate 11, may be used in such a manner that the optical information memory layer 3 be integrally interposed between the two substrates 1' and 11 by the same method, using the same materials as mentioned above in the same manner as in DVD.

As mentioned above, it is preferable that the reversible display recording layer be a reversible thermosensitive display recording layer comprising a material of which transparency or color tone is reversibly changeable depending upon the application of thermal energy thereto.

It is preferable that the substrate comprise a resin having a glass transition temperature Tg(° C.), and that the reversible thermosensitive display recording layer has a recording temperature Tr(° C.), with a relationship of:

$$Tr \leq 1.6 \times Tg \quad (1)$$

It is more preferable that the recording temperature Tr(° C.) of the reversible thermosensitive display recording layer and the glass transition temperature Tg(° C.) of the resin for the substrate be in the following relationship:

$$Tr \leq 1.5 \times Tg \quad (3)$$

It is furthermore preferable that the recording temperature Tr(° C.) of the reversible thermosensitive display recording layer and the glass transition temperature Tg(° C.) of the resin for the substrate be in the following relationship:

$$Tr \leq 1.4 \times Tg \quad (4)$$

When the recording temperature Tr(° C.) of the reversible thermosensitive display recording layer is excessively high, the substrate will be deformed when recording is performed, so that in particular when the substrate is in a disk-shaped and deformed, the incidence and reflection of a laser beam applied thereto are adversely affected by the deformation so as to make the reading and writing information impossible, while when the recording temperature Tr(° C.) of the reversible thermo-sensitive display recording layer is excessively low, the heat resistance of images recorded therein tends to become too low to be used in practice.

The recording temperature Tr(° C.) of the reversible thermosensitive display recording layer is defined as a higher temperature either of an image formation temperature or an image erasing temperature. Specifically, the recording temperature Tr(° C.) of the reversible thermosensitive display recording layer is determined by the following heat application method, using a heat gradient tester "Type HG-100" (Trademark), made by Toyo Seiki Seisakusho, Ltd.

The heat gradient tester includes five heat application blocks. Each block can be independently set at a different temperature with a different heat application time and the application of a different pressure. Thus, the reversible thermosensitive display recording layer can be heated to five different temperatures at five different portions simultaneously under predetermined conditions.

More specifically, with the heat application time set at 1 second, the test sample is heated to a low temperature at which the transparency or the color tone is not changed to an appropriate temperature at which the transparency or the color tone is sufficiently changed, with equal temperature intervals in a range of 1° C. to 5° C.

In order to prevent the reversible thermosensitive display recording layer from adhering or sticking to the heat block, a polyimide or polyamide film with a thickness of 10 μm or less may be interposed between the test sample and the heat block.

Figure 8A:
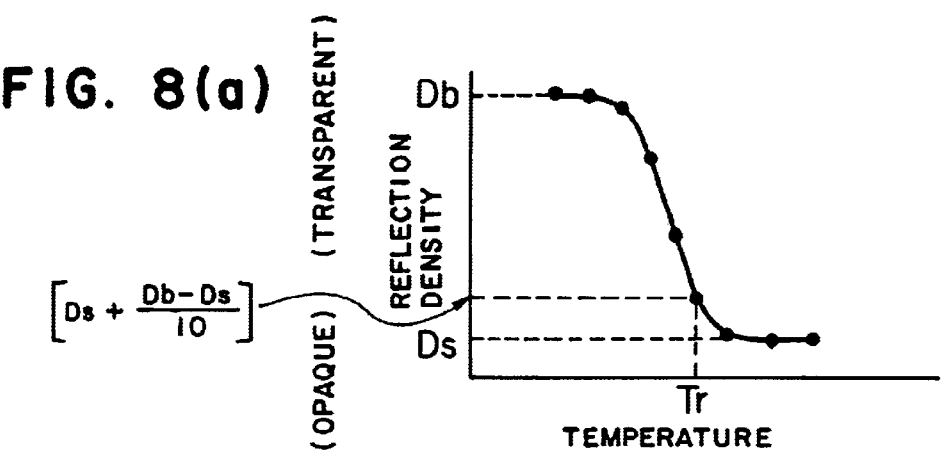
FIG. 8(a) is a diagram in explanation of a recording temperature of a reversible thermosensitive display recording layer, which reversibly assumes a transparent state or a white opaque state, with the white opaque state at high temperature.

In the course of the above-mentioned determination of the recording temperature, if the heat transfer from the heat blocks to the reversible thermosensitive display recording layer is insufficient with the reversible thermosensitive display recording layer being in the optical information memory medium and not in direct contact with the heat blocks, the reversible thermosensitive display recording layer may be removed from the optical information memory medium and heat may be applied to the reversible thermosensitive display recording layer. If it is necessary to rapidly cool the heated reversible thermosensitive display recording layer, the heated reversible thermosensitive display recording layer may be brought into contact with a cooled metal or cold water, or may be immersed into liquid nitrogen. Thus, the heated reversible thermosensitive display recording layer is then cooled to room temperature, and the density of each heated portion in the reversible thermosensitive display recording layer is measured by use of Macbeth densitometer RD-914, whereby a graph as shown in FIGS. 8(*a*) to 8(*c*) can be obtained with the temperature set by the heat gradient tester as abscissa, and the reflection density of the heated portion as ordinate.

In the case where the reversible thermosensitive display recording layer is reversibly changeable to a transparent state or a white opaque state and vice versa, if there is disposed a light reflection layer behind the reversible thermosensitive display recording layer, the reflection density thereof can be measured as it is. However, when only the reversible thermosensitive display recording layer is subjected to the above-mentioned measurement of the reflection density, for instance, because the reversible thermosensitive display recording layer is separated and removed from the optical information memory medium, the measurement is conducted by placing a light-absorbing sheet or a regular reflection sheet behind the reversible thermosensitive display recording layer.

Figure 8B:
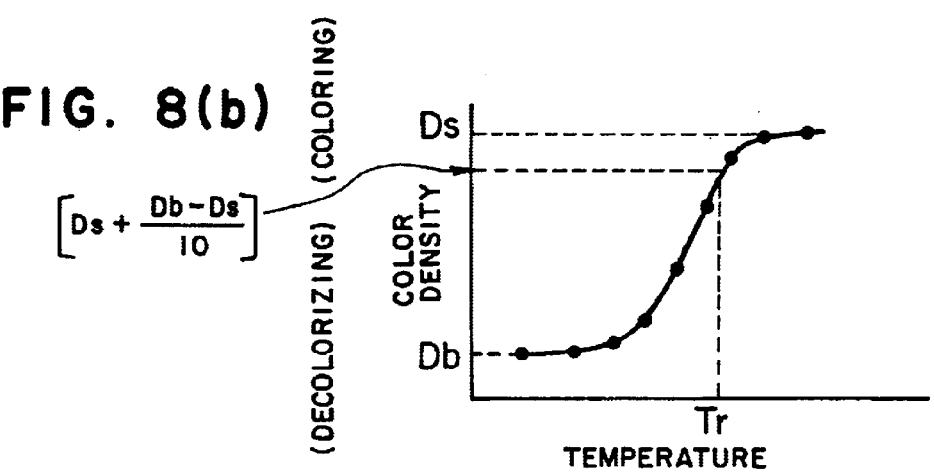
FIG. 8(b) is a diagram in explanation of a recording temperature of a reversible thermosensitive display recording layer, which reversibly assumes a colored state at high temperature.

In the graphs shown FIGS. 8(*a*) to 8(*c*), as mentioned above, the reflection density of each of the heated portions is plotted as ordinate and the temperature for each heated portion is plotted as abscissa so that the curves as shown in FIGS. 8(*a*) to 8(*c*) are obtained.

The recording temperature Tr(° C.) of the reversible thermosensitive display recording layer is read from these graphs. For example, FIG. 8(*a*) is a graph obtained by the above-mentioned method, with respect to a reversible thermosensitive display recording layer which can reversibly assume a transparent state or a white opaque state, and is particularly capable of assuming the white opaque state when heated to a high temperature. As shown in FIG. 8(*a*), the recording temperature Tr is defined as a cross point temperature corresponding to a cross point of the curve and a reflection density represented by a formula of [Ds+ ¹⁄₁₀(Db−Ds)] wherein Ds a saturated recording reflection density and Db is a background density, for instance, the density of the light-absorbing sheet placed behind the reversible thermosensitive display recording layer.

In the case where the reversible thermosensitive display recording layer is reversibly changeable to a color-developed state at a high temperature, the curve is as shown in FIG. 8(*b*), which is upside down in comparison with the curve in FIG. 8(*a*), but the definition of the recording temperature Tr is the same.

Figure 8C:
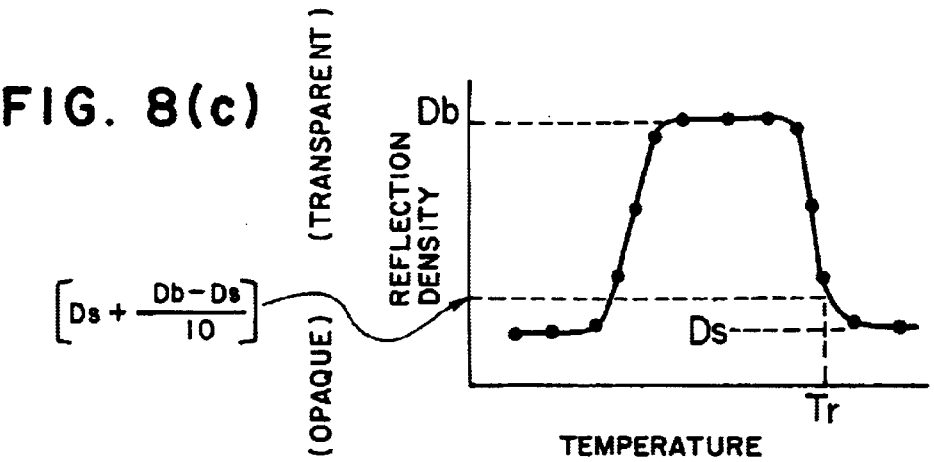
FIG. 8(c) is a diagram in explanation of a recording temperature of a reversible thermosensitive display recording layer, of which transparency reversibly changes depending upon the temperature of the reversible thermosensitive display recording layer.

FIG. 8(c) shows the case where the transparency or the color tone of the reversible thermosenistive display recording layer is reversibly changeable depending upon the temperature thereof. In the case of FIG. 8(c), such a reversible thermosensitive display recording layer that assumes a transparent state when heated to a temperature higher than room temperature and assumes a white opaque state when heated to a temperature than the above-mentioned temperature as shown in FIG. 2 is initially made white opaque in its entirety, and is then heated to a predetermined temperature, and then cooled to room temperature. FIG. 8(c) shows a graph of the reflection density of such reversible thermosensitive display recording layer after the above-mentioned process. In this case, as mentioned above, the recording temperature Tr is defined as the temperature at which the reversible thermosensitive display recording layer assumes the white opaque state at high temperature. The same thing as this can be applied to a reversible thermosensitive display recording layer of a type which is decolorized at a low temperature and is colored at a high temperature although this case is not depicted in FIG. 8(a).

It is preferable that the recording temperature (Tr) of the reversible thermosensitive display recording layer be in the range of 120° C. to 200° C., more preferably in the range of 130° C. to 180° C.

It is preferable that in the optical information memory medium of the present invention, the substrate comprise a resin having a glass transition temperature Tg(° C.), and the reversible thermosensitive display recording layer have a recording temperature Tr(° C.) and a thickness Lr ($\mu$m), with a relationship of:

$$Tr \le 1.3 \times Tg \times \frac{Lr + Ld}{Lr + 0.8 \times Ld} \quad (2)$$

wherein Tr is the recording temperature(° C.) of the reversible thermosensitive display recording layer, Lr is the thickness ($\mu$m) of the reversible thermosensitive display recording layer, and Ld is a distance($\mu$m) between (a) a surface of the substrate on the side of the reversible thermosensitive display recording layer and (b) a surface of the reversible thermosensitive display recording layer on the side of the substrate.

The above-mentioned distance Ld between (a) the surface of the substrate on the side of the reversible thermosensitive display recording layer and (b) the surface of the reversible thermosensitive display recording layer on the side of the substrate has a significant effect on the elevation of the temperature of the substrate in the course of the application of heat to the reversible thermosensitive display recording layer when the heat application time is short. More specifically, when the heat application time is long, the heat is transferred to the substrate and eventually the temperature of the substrate is elevated to the same temperature as that of the surface of the reversible thermosensitive display recording layer. In contrast to this, when the heat application time is short, only the surface portion of the reversible thermosensitive display recording layer is heated, and the temperature elevation in the portion below the reversible thermosensitive display recording layer is significantly reduced. This phenomenon is particularly prominent when the heat application is conducted by the application of laser beams. At that moment, the heat application time is 500 $\mu$s or less, or 100 $\mu$s or less. In the case of the heat application using a thermal head, the above-mentioned effect is not so prominent as in the case of heat application using the laser beams, but when the heat application time is 2 ms or less, or 1 ms or less, there is a case where the above-mentioned distance Ld may nave some effect on the elevation of the temperature of the substrate.

It is more preferable that the recording temperature Tr (° C.) of the reversible thermosensitive display recording layer, the thickness Lr ($\mu$m) of the reversible thermosensitive display recording layer, and the distance Ld($\mu$m) between (a) the surface of the substrate on the side of the reversible thermosensitive display recording layer and (b) the surface of the reversible thermosensitive display recording layer on the side of the substrate be in the relationship represented by formula (5), furthermore preferably in the relationship represented by formula (6) as follows:

$$Tr \le 1.2 \times Tg \times \frac{Lr + Ld}{Lr + 0.8 \times Ld} \quad (5)$$

$$Tr \le 1.15 \times Tg \times \frac{Lr + Ld}{Lr + 0.8 \times Ld} \quad (6)$$

As mentioned above, when the recording temperature Tr(° C.) of the reversible thermosensitive display recording layer is excessively high, the substrate will be deformed when recording is performed, so that in particular when the substrate is in a disk-shaped and deformed, the incidence and reflection of a laser beam applied thereto are adversely affected by the deformation so as to make the reading and writing information impossible, while when the recording temperature Tr(° C.) of the reversible thermosensitive display recording layer is excessively low, the heat resistance of images recorded therein tends to become too low to be used in practice.

In order that the recording temperature Tr of the reversible thermosensitive display recording layer satisfy the above-mentioned conditions, it is preferable that the reversible thermosensitive display layer comprise a matrix resin and an organic low-molecular-weight material dispersed in the matrix resin, capable of assuming a transparent state or an opaque state reversibly with the application of heat thereto. When the above-mentioned reversible thermosensitive display layer is capable of assuming a transparent state when heated to a first predetermined temperature, and a white opaque state when heated to a second predetermined temperature, it is also preferable that the organic low-molecular-weight material comprise as at least part of the organic low-molecular-weight material an organic low-molecular-weight component with a melting point of 100° C. or more, but not more than 1.6 times the glass transition temperature of a resin which forms the substrate.

It is also preferable that the organic low-molecular-weight material comprise at least two organic low-molecular-weight components with different melting points with a difference of at least 30° C.

It is also preferable that the reversible thermosensitive display recording layer comprises an electron-donating coloring material and an electron-accepting material capable of inducing color formation in the electron-donating coloring material by a coloring reaction between the electron-donating coloring material and the electron-accepting material, and that the electron-accepting material comprise at least as part of the electron-accepting material an electron-accepting compound with a melting point of 120° C. or more, but not more than 1.6 times the glass transition temperature of the resin for the substrate.

The above-mentioned distance Ld between (a) the surface of the substrate on the side of the reversible thermosensitive display recording layer and (b) the surface of the reversible thermosensitive display recording layer on the side of the substrate will now be more specifically explained with reference to FIG. 1.

In FIG. 1, the distance Ld is the distance between (a) the interface between the substrate 1 and the first dielectric layer 2 and (b) the interface between the reversible display recording layer 7 and the intermediate layer 6.

In FIG. 4, the distance Ld is the distance between (a) the interface between the substrate 1 and the first dielectric layer 2 and (b) the interface between the reversible display recording layer 7 and the support 10.

In FIG. 5(a), the distance Ld is the distance between (a) the interface between the substrate 1 and the first dielectric layer 2 and (b) the interface between the reversible display recording layer 7 and the adhesive or tacky layer 9.

In FIG. 7, the distance Ld is the distance between (a) the interface between the second substrate 11 and the adhesive or tacky layer 2 and (b) the interface between the reversible display recording layer 7 and the support 10.

It is preferable that the optical information memory medium of the present invention has a warping angle of ±0.6 deg or less and a warpage of 0.4 mm or less.

The warping angle is defined as a maximum angle of all the angles that are formed by (a) a disk surface serving as a reference surface, which is formed by clamping a completely flat disk of the optical information memory medium of the present invention, and (b) all the tangents to the surface of a disk of the optical information memory medium of the present invention to be measured. The warpage is defined as a distance between the above-mentioned reference surface and a point of the disk to be tested at which the disk is most separated away from the reference surface.

When the warping angle and the warpage respectively exceed the above-mentioned respective ranges, it may occur that recorded information cannot be appropriately read since the light reflected by the disk does not accurately return to a right position of a pickup, an/or that a beam spot is deformed before writing, so that pits cannot be formed in appropriate forms and therefore recorded information cannot be correctly read.

It is preferable that the optical information memory medium of the present invention be in a disk-shaped, and have a center-of-gravity value of less than 2.5 g·mm, which is obtained by multiplying the weight (g) of the disk and the distance (mm) between the center of the disk and the center of gravity of the disk. When the center-of-gravity value is more than the above-mentioned value, the disk tends to be vibrated during high speed reproduction so that high speed reproduction cannot be always performed appropriately.

It is preferable that at least part of the information that is stored in the optical information memory medium and recorded in the reversible display recording layer in a visibly recognizable form be in the form of a bar code.

When the reversible thermosensitive display layer comprises a matrix resin and an organic low-molecular-weight material dispersed in the matrix resin and is capable of assuming a transparent state when heated to a first predetermined temperature, and a white opaque state when heated to a second predetermined temperature, the image contrast at the time of reading the bar code is improved when the average particle size of the particles of the organic low-molecular-weight material is in the range of $\frac{1}{8}$ to 2 times the wavelength of a light of a light source for reading the bar code. It has not yet been clarified why such a phenomenon takes place, but it is assumed that this probably takes place in accordance with the following mechanism.

The degree of white opaqueness of the reversible thermosensitive display recording layer, that is, the degree of light scattering of the reversible thermosensitive display recording layer, is considered to be determined in accordance with the size of the crystals of the organic low-molecular-weight material in the particles thereof. Furthermore, the size of the crystals of the organic low-molecular-weight material in the particles thereof is considered to be determined in accordance with the size of the particles of the organic low-molecular-weight material. This is because it is considered that the area of the interfaces between the organic low-molecular-weight material dispersed in the matrix resin and the matrix resin is determined depending upon the size of the particles of the organic low-molecular-weight material, and the magnitude of the mutual action between the matrix resin and the organic low-molecular-weight material is determined depending upon the area of the above-mentioned interfaces.

There is a particular size of a crystal at which size the crystal scatters light most. The size differs depending upon the kind of the material of the crystal, but a crystal with a size smaller than the wavelength of light is apt to scatter the light.

In other words, it is considered that when the average particle size of the particles of the organic low-molecular-weight material is in the range of $\frac{1}{8}$ to 2 times the wavelength of the light for reading the bar code, individual polycrystals in the particles of the organic low-molecular-weight material in a milky white state are in such a size that the light with the wavelength is scattered most. When the average particle size of the particles of the organic low-molecular-weight material is in less than $\frac{1}{8}$ the wavelength of the light for reading the bar code, the light scattering effect is reduced, and accordingly the degree of milky white opaqueness and the image contrast are lowered. On the other hand, when the average particle size of the particles of the organic low-molecular-weight-material is more than 2 times the wavelength of the light for reading the bar code, the area of the interfaces between the matrix resin and the organic low-molecular-weight material is reduced, and the mutual action between the matrix resin and the organic low-molecular-weight material is also reduced, so that it is difficult to control the particle size of the crystals of the organic low-molecular-weight material in the particles thereof and accordingly the degree of milky white opaqueness and the image contrast are lowered.

It is considered that the particle size of the organic low-molecular-weight material can be controlled by a method of mixing the organic low-molecular-weight material with a poor solvent, a method of controlling the heat application and drying temperature in the course of a coating process of a recording layer formation liquid containing the organic low-molecular-weight material, and a method of adding to the organic low-molecular-weight material a surfactant for controlling the dispersibility.

Conventionally, it is regulated that the wavelength of light for reading bar codes be 600 nm or more by the Japanese Industrial Standards (JIS B9550). Usually, light sources with a wavelength in the range of 600 nm to 1000 nm are employed for reading bar codes. Specific examples of such light sources are LED such as LED with a wavelength of 660 nm and LED with a wavelength of 940 nm which are widely used, and laser such as He—Ne laser with a wavelength of 600 nm, and semiconductor lasers with a wavelength of 680 nm, a wavelength of 780 nm, and a wavelength of 960 nm which are widely used.

As a matter of course, the bar code displayed in the reversible thermosensitive display recording layer can be read, using a light source with a light having a wavelength of 660 nm or more. A light source with a shorter wavelength can also be used with the bar code displayed in the reversible thermosensitive display recording layer, and a higher contrast can be obtained when such light source with a shorter wavelength is used. More specifically, for example, when light with a wavelength of 400 to less than 600 nm is employed for reading the bar code, a maximum image contrast obtained by the light is about 2 times an image contrast obtained by light with a wavelength of 600 nm to 10000 nm. It is considered that this is because the organic low-molecular-weight material has a greater refractive index with respect to the light with a shorter wavelength than a refractive index with respect to the light with a longer wavelength, so that the light scattering is increased, and accordingly the degree of milky white opaqueness is also increased.

The "bar code" mentioned here means any optical recognition pattern display member which is capable of recognizing changes in optical properties such as the intensity of light and changes of wavelength as the information to be read, regardless of the wavelength, such as the wavelength of visible light. The "bar code" includes other optical recognition pattern display member such as two-dimensional bar codes, optical character recognition (OCR) patterns, and a code consisting of four distinguishable areas capable of representing sixteen different types of information in total, namely, calra.

As mentioned above, when the reversible thermosensitive display layer which is capable of reversibly assuming a transparent state when heated to a first predetermined temperature, and a white opaque state when heated to a second predetermined temperature, it is preferable that a light reflection layer for improving a display contrast of the reversible thermosensitive display recording layer be disposed behind the reversible thermosensitive display recording layer. As such a light reflection layer, the light reflection and heat dissipation layer 5 as shown in FIGS. 1, 4, 5(a), 5(b) and 7 may be used as well. In this case, it is preferable that the glossiness of the light reflection layer or the light reflection and head dissipation layer 5, when measured from the side of the surface of the reversible thermosensitive display recording layer in a transparent state, be 150% or more, more preferably 200% or more, furthermore preferably 250% or more, when measured by a method of ASTM D523 (60° gloss). The higher the glossiness, the higher the display contrast.

It is also preferable that the glossiness be 700% or less, more preferably 600% or less. When the glossiness is high, the display contrast is improved, but when the glossiness is excessively high, it may occur that it is difficult to see the images formed in the reversible thermosensitive display recording layer, due to regular reflection of light, depending upon the viewing angle thereof.

The glossiness can be adjusted by adjusting the flatness or smoothness of the surface of the light reflection layer or the light reflection and heat dissipation layer 7.

In the optical information memory medium of the present invention, it is preferable that a top surface of the optical information memory medium on the side of the reversible display recording layer have a Ten-Point Mean Roughness (Rz) in a range of 0.3 to 3.0 $\mu$m (JIS B0601). It is also preferable that the top surface of the optical information memory medium on the side of the reversible display recording layer have a Center-line Mean Roughness (Ra) in a range of 0.05 to 1.0 $\mu$m (JIS B0601). By causing the top surface of the optical information memory medium to have such roughness, the adhesion of a thermal head to the surface of the optical information memory medium, when the thermal head comes into contact with the surface of the optical information memory medium and heats the same, can be prevented, so that the thermal head can run in smooth contact with the surface of the optical information memory medium and therefore the uniformity of images obtained can be significantly improved. However, when the top surface of the optical information memory medium is excessively rough, the glossiness of the surface is excessively reduced, so that there is caused a problem of the image contrast being reduced.

The optical information memory medium of the present invention may further comprises a reversible display recording area at least on part of a surface of the substrate on the side of the optical information memory layer, and also an irreversible display recording area on the same surface as that of the surface of the substrate, whereby such information that is often rewritten, for example, a latest rewriting date on which the information stored in the optical information memory layer is rewritten, and a title of a rewritten file, can be visibly recorded in the reversible display recording area, while such information that is not rewritten, for example, a serial number of the optical information memory medium, and the owner's name, can be visibly recorded in the irreversible display recording area. This is very convenient for the user. The recording of such information in the irreversible display recording area can be performed, for example, by ink jet recording method, thermal image transfer method, or electrophotography. However the recording method is not limited to these methods. Of these methods, ink jet printing method and thermal image transfer method are preferable since the apparatus therefor can be made small in size. Ink Jet printing method has an advantage over other methods that "out-of-contact" printing can be performed on the optical information memory medium, so that there is no risk that the medium is deformed during printing. Thermal image transfer recording method has an advantage over other methods that a recording apparatus therefor can be made smaller in size and lighter in weight since the same thermal head can be used when the reversible display recording layer is the reversible thermosensitive display recording layer.

It is preferable that the irreversible display recording area be a hydrophilic surface to which a water base ink can be fixed. It is also preferable that the irreversible display recording area be made of a hydrophilic resin. An organic or inorganic filler may be added to the irreversible display recording area in order to facilitate the permeation of the water base ink through the irreversible display recording area.

The hydrophilic surface of the irreversible display recording area to which the water base ink can be fixed can be formed, for example, by printing, coating, or applying a label having such a hydrophilic surface to the substrate.

Specific examples of hydrophilic resin films for use in the irreversible display recording area, for improving the printing performance of the water base ink by increasing the wettability to the water base ink, and hydrophilic property of the irreversible display recording area are films comprising at least one resin selected from the group consisting of polyethylene oxide, polyvinyl alcohol, polyvinyl methyl ether, polyvinyl formal, carboxy vinyl polymer, hydroxyethyl cellulose, hydroxypropyl cellulose, methyl cellulose, carboxymethyl cellulose sodium salt, polyvinyl pyrrolidone and morpholine.

Other additives such as water-absorbing pigment, humectant, antiforming agent and surface tension adjusting agent can be also added into the hydrophilic resin film.

As the thermal image transfer recording method, there are two types. One is a fusion-type thermal image transfer recording method, using mainly pigment, dye, wax and resin, and the other is a sublimation-type thermal image transfer recording method, using mainly a sublimable dye.

In the case of the fusion-type thermal image transfer recording method, there is no particular restriction to the properties of the surface to which image transfer is carried out. For example, images can be formed either on the reversible display recording layer, or on a protective layer formed on the reversible display recording layer.

In the case of the sublimation-type thermal image transfer recording method, however, it is preferable that an image receiving layer be provided on an intermediate layer or on a protective layer formed on the reversible display recording layer. It is also preferable that a close contact layer be interposed between the image receiving layer and the intermediate layer or between the image receiving layer and the protective layer.

The image receiving layer can be made of a dyeable resin such as polyester, cellulose ester, polycarbonate, or polyvinyl chloride, which is employed in a dye-receiving layer of a printing paper for a conventional sublimable thermal image transfer recording method. The image receiving layer can also be made of an intercalation compound which is capable of fixing a cationic dye by an ion-exchange reaction, and a binder resin. In this case, it is preferable that a cationic dye be employed as the dye when the sublimation-type thermal image transfer recording is carried out. When the image receiving layer is formed, using the intercalation compound, and thermal image transfer recording is carried out, using the cationic dye, the thermally transferred cationic dye is trapped by the intercalation compound in the image receiving layer, so that dye images with excellent image fixing performance and durability can be obtained.

Specific examples of the intercalation compounds for use in the image receiving layer are disclosed in Japanese Laid-Open Patent Application 4-299183. Representative preferable examples of the intercalation compounds are clay intercalation compounds such as montmorillonite.

Figure 9:
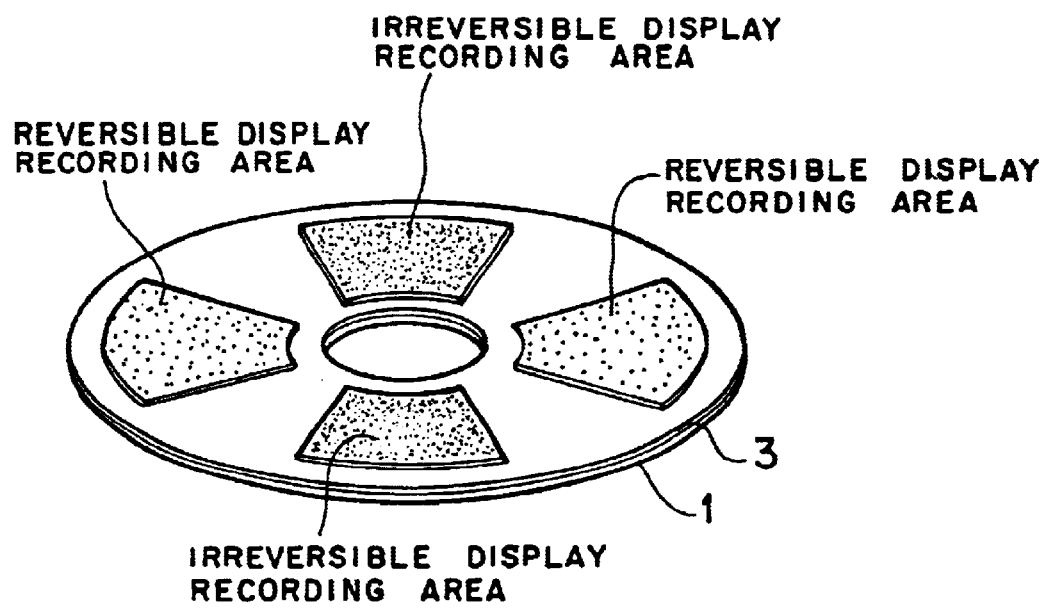
FIG. 9 is a perspective view of a disk-shaped optical information memory medium of the present invention, which has both an irreversible display recording area and a reversible display recording area.

When the substrate is disk-shaped, it is preferable that the reversible display recording area and the irreversible display recording area be positioned in a central symmetry with respect to the center point of the disk of the substrate as illustrated in FIG. 9.

A display recording method of the present invention, which uses the above-mentioned optical information memory medium comprising the substrate, the optical information memory layer provided on the substrate, the reversible display recording layer provided on the optical information memory layer, the substrate, the optical information memory layer and the reversible display recording layer being formed integrally, comprises the steps of:

memorizing and/or rewriting information that can be optically read by applying a laser beam thereto in the optical information memory layer, and recording and/or rewriting at least part of the memorized and/or recorded information in the reversible display recording layer in a visibly recognizable form.

Examples of information to be rewritten and displayed are title, file name, used memory capacity, usable memory capacity, preparation date of file, date and time of file updating, file format, and images as desired. Information to be rewritten is not limited to these.

In the above-mentioned display recording method, when the reversible display recording layer is a reversible thermosensitive display recording layer with a transparency or a color tone thereof being thermally changeable, at least part of the information memorized and/or rewritten in the optical information memory layer is recorded and/or rewritten in the reversible thermosensitive display recording layer with the application of heat thereto in the visibly recognizable form.

When the substrate comprises a resin, it is also preferable that the application of heat be conducted at a temperature which is 1.6 times or less a glass transition temperature of the resin of substrate in order to record and/or rewrite the information in the visibly recognizable form.

In the above-mentioned display recording method, it is furthermore preferable that the application of heat be conducted at a temperature corresponding to at least a temperature obtained by multiplying the glass transition temperature of the resin of the substrate by the following:

$$\frac{L3 \times (Lr + Ld)}{Lr + 0.8 \times Ld}$$

wherein Lr is the thickness ($\mu$m) of the reversible thermosensitive display recording layer, and Ld is a distance ($\mu$m) between (a) a surface of the substrate on the side of the reversible thermosensitive display recording layer and (b) a surface of the reversible thermosensitive display recording layer on the side of the substrate in order to record and/or rewrite the information in the visibly recognizable form.

The reversible thermosensitive display recording in the reversible thermosensitive display recording layer can be performed, either by using image formation means and image erasing means separately or by using the same heat application means for image formation and image erasure.

In the case where the image formation means and the image erasing means are used separately, for example, a thermal head and a laser can be used as the image formation means, and a hot stamp, a ceramic heater, and another thermal head can be used as the image erasing means.

In the case where the same heat application means for image formation and image erasure is used, for example, a thermal head and a laser can be used as the image formation and image erasing means. By use of the same heat application means for image formation and image erasure, the image formation and image erasing apparatus can be made small in size. Furthermore, a so-called overwrite recording method of erasing a previously formed image as a whole and then forming a new image thereon, can be carried out by controlling the temperature of each of heat emitting elements of the thermal head to such a temperature at which the previously formed image can be erased at one time, and then by controlling the temperature of each of the heat emitting elements of the thermal head to such a temperature at which the new image is formed thereon.

In the display recording method of the present invention, in which the optical information memory medium further comprises the reversible display recording area at least on part of the surface of the substrate on the side of the optical information memory layer, and also the irreversible display recording area on the same surface as that of the surface of the substrate, there may be contained a further step of depositing imagewise a material comprising a dye or a pigment on the irreversible display recording area.

The information to be recorded in the irreversible display recording area is such information that is not rewritten, for example, a serial number of the optical information memory medium, a photograph, and a multi-color picture that are difficult to record in the reversible display recording area, although the information to be recorded is not limited to such kind of information.

It is preferable that recording of the information in the irreversible display recording area be carried out by the ink jet printing method with imagewise deposition of a water base ink in the irreversible display recording area.

When the recording of the information in the irreversible display recording area by the thermal image transfer recording method, it is preferable that a material comprising a pigment or a dye be imagewise deposited in the irreversible display recording area.

When the irreversible display recording is carried out by the thermal image transfer recording, and the reversible display recording is carried out by the reversible thermosensitive display recording, it is preferable that the same thermal head be used for the image formation, and that a thermal image transfer ribbon be used for the thermal image transfer recording, and that the reversible thermosensitive recording be carried out by bringing the thermal head into direct contact with the surface of the optical information memory medium on the side of the reversible thermosensitive display recording layer, with the detachment of the thermal image transfer ribbon.

Other features of this invention will become apparent in the course of the following description of exemplary embodiments, which are given for illustration of the invention and are not intended to be limiting thereof.

EXAMPLE 1

On a disk-shaped polycarbonate substrate with a thickness of 1.2 mm, having grooves with a width of 0.5 $\mu$m and a depth of 35 nm, there were successively overlaid a first dielectric layer, an optical information memory layer, a second dielectric layer, and a light reflection and heat dissipation layer by a single-disk-system sputtering apparatus, with a 10-second cycle time.

The first dielectric layer comprised as the main components Zn, S, Si and O, and was formed with a thickness of 120 nm.

The optical information memory layer comprised as the main components Ag, In, Sb and Te, containing N and O, each in an amount of 1 wt. %, as additive elements, and was formed with a thickness of 30 nm.

The second dielectric layer comprised as the main components Zn, S, Si and O, with the same composition as that of the first dielectric layer, and was formed with a thickness of 40 nm.

The light reflection and heat dissipation layer was made of an aluminum alloy and was formed with a thickness of 100 nm.

An intermediate layer with a thickness of about 5 $\mu$m was formed on the light reflection and heat dissipation layer by spin coating of an ultraviolet curing resin, whereby a phase-change optical disk was fabricated.

The thus fabricated optical disk was subjected to a crystallization processing for the optical information memory layer of the optical disk by an initialization apparatus having a large diameter LD under the initialization conditions that 95% or more of a saturated reflection can be guaranteed.

A label having a reversible thermosensitive display recording layer capable of reversibly assuming a transparent state or a white opaque state by the application of heat thereto was prepared as follows:

Aluminum was deposited in vacuum with a thickness of about 600 Å on a support composed of a 50 $\mu$m thick transparent polyaramide film (Trademark: "Aramica 50R", made by Asahi Chemical Industry Co., Ltd.), whereby a light reflection layer was formed.

Vinyl chloride-vinyl acetate-phosphate copolymer (Trademark: "Denka Vinyl #1000P", made by Denki Kagaku Kogyo K.K.) was dissolved in a mixed solvent of MEK (methyl ethyl ketone) and toluene (1:1) to prepare a resin solution. This resin solution was coated with a thickness of about 1 $\mu$m when dried with the application of heat thereto on the light reflection layer, whereby an adhesive layer was formed on the light reflection layer.

A mixture of the following components was coated on the adhesive layer, dried with the application of heat thereto to form a layer with a thickness of about 10 $\mu$m:

| | Parts by Weight |
| --- | --- |
| Behenic acid ((Reagent with a purity of 99%, made by Sigma Chemical Co.) | 9 |
| 1,4-cis-cyclohexyl dicarbonic acid (Reagent, made by Tokyo Kasei Kogyo Co., Ltd.) | 0.5 |
| 1,4-trans-cyclohexyl dicarbonic acid (Reagent, made by Tokyo Kasei Kogyo Co., Ltd.) | 0.5 |
| Vinyl chloride-vinyl acetate-vinyl alcohol copolymer (Trademark: "VAGH", made by Union Carbide Japan K.K.) | 27 |
| Isocyanate compound (Trademark: "Coronate HL", made by Nippon Polyurethane Industry Co., Ltd.) | 3 |
| Tetrahydrofuran (THF) | 250 |
| Toluene | 20 |

The above coated layer was then subjected to a cross-linking treatment at 60° C. for 24 hours, whereby a reversible thermosensitive display recording layer was formed.

A mixture of the following components was uniformly dispersed to prepare a coating liquid:

| | Parts by Weight |
| --- | --- |
| 75% butyl acetate solution of urethane acrylate-based ultraviolet-curing resin (Trademark: "Unidic C7-157", made by Dainippon Ink & Chemicals, Incorporated.) | 10 |
| Calcium carbonate (Trademark: "Brilliant 15", made by Shiraishi Kogyo Kaisha, Ltd.) | 1 |
| Toluene | 10 |

The above coating liquid was then coated on the above reversible thermosensitive display recording layer, using a wire bar, and then cured with the radiation of ultraviolet light, using a 80 W/cm ultraviolet lamp, whereby a protective layer with a thickness of about 3 $\mu$m was formed on the reversible thermosensitive display recording layer.

The recording temperature of this reversible thermosensitive display recording layer, at which the recording layer assumed a white opaque state, was 150° C.

An acrylic adhesive agent was applied with a thickness of about 5 $\mu$m to the back side of the support, opposite to the recording side of the reversible thermosensitive display recording layer, whereby a reversible thermosensitive display recording layer bearing label was prepared. This label was cut into a donut-shaped label as illustrated in FIG. 6(a) and applied to the above-mentioned disk, whereby an optical information memory medium No. 1 of the present invention, which is an optical information memory medium with a reversible display function, was fabricated.

EXAMPLE 2

The same procedure of fabricating the optical information memory medium No. 1 of the present invention as in Example 1 was repeated except that the formulation of the reversible thermosensitive display recording layer in Example 1 was replaced by the following, whereby an optical information memory medium No. 2 of the present invention, which is an optical information memory medium with a reversible display function, was fabricated:

|  | Parts by Weight |
| --- | --- |
| Methyl lignocerate (Reagent, made by Tokyo Kasei Kogyo Co., Ltd.) | 7.5 |
| Deoxycholic acid (Reagent, made by Tokyo Kasei Kogyo Co., Ltd.) | 2.5 |
| Vinyl chloride-vinyl acetate-vinyl alcohol copolymer (Trademark: "VAGH", made by Union Carbide Japan K.K.) | 27 |
| Isocyanate compound (Trademark: "Coronate HL", made by Nippon Polyurethane Industry Co., Ltd.) | 3 |
| Tetrahydrofuran (THF) | 250 |
| Toluene | 20 |

The recording temperature of this reversible thermosensitive display recording layer, at which the recording layer assumed a white opaque state, was 175° C.

EXAMPLE 3

The same procedure of fabricating the optical information memory medium No. 1 of the present invention as in Example 1 was repeated except that the formulation of the reversible thermosensitive display recording layer in Example 1 was replaced by the following, whereby an optical information memory medium No. 3 of the present invention, which is an optical information memory medium with a reversible display function, was fabricated:

|  | Parts by Weight |
| --- | --- |
| Behenic acid (Reagent with a purity of 99%, made by Sigma Chemical Co.) | 5 |
| Eicosanedioic acid (Trademark: "SL-20-90", made by Okamura Oil Mill, Ltd.) | 5 |
| Vinyl chloride-vinyl acetate-vinyl alcohol copolymer (Trademark: "VAGH", made by Union Carbide Japan K.K.) | 27 |
| Isocyanate compound (Trademark: "Coronate HL", made by Nippon Polyurethane Industry Co., Ltd.) | 3 |
| Tetrahydrofuran (THF) | 250 |
| Toluene | 20 |

The recording temperature of this reversible thermosensitive display recording layer, at which the recording layer assumed a white opaque state, was 132° C.

EXAMPLE 4

The same procedure of fabricating the optical information memory medium No. 1 of the present invention as in Example 1 was repeated except that the 50 $\mu$m thick transparent polyaramide film (Trademark: "Aramica 50R", made by Asahi Chemical Industry Co., Ltd.) employed as the support for the reversible thermosensitive display recording layer bearing label employed in Example 1 was replaced by a 25 $\mu$m thick polyaramide film (Trademark: "Aramica 25R", made by Asahi Chemical Industry Co., Ltd.), whereby an optical information memory medium No. 4 of the present invention, which is an optical information memory medium with a reversible display function, was fabricated.

EXAMPLE 5

A reversible thermosensitive display recording layer was prepared in the same manner as that of the reversible thermosensitive display recording layer bearing label in Example 1 except that the adhesive layer formed on the light reflection layer, the protective layer formed on the reversible thermosensitive display recording layer, and the acrylic adhesive agent layer formed on the back side of the support were eliminated from the reversible thermosensitive display recording layer bearing label in Example 1.

The same optical disk as fabricated in Example 1 was fabricated.

The same adhesive layer as formed on the light reflection layer in Example 1 was formed on the above prepared reversible thermosensitive display recording layer, and as shown in FIG. 5($a$) and FIG. 5($b$), the adhesive layer was brought into contact with the surface of the above fabricated optical disk on the side of the optical information memory layer, so that the reversible thermosensitive display recording layer was transferred to the optical disk.

With the elimination of the support from the reversible thermosensitive display recording layer, the same protective as prepared in Example 1 was provided on the reversible thermosensitive display recording layer, whereby an optical information memory medium No. 5 of the present invention, which is an optical information memory medium with a reversible display function, was fabricated.

EXAMPLE 6

The same coating liquid for the formation of the reversible thermosensitive display recording layer as in Example 1 was directly coated on the same intermediate layer of the phase-change optical disk as fabricated in Example 1, using a dye head, and dried with the application of heat thereto, whereby a reversible thermosensitive display recording layer with a thickness of about 10 $\mu$m was formed on the intermediate layer of the phase-change optical disk. The reversible thermosensitive display recording layer was then subjected to a cross-linking treatment at 60° C. for 24 hours.

The same protective as prepared in Example 1 was formed on the above reversible thermosensitive display recording layer, whereby an optical information memory medium No. 6 of the present invention, which is an optical information memory medium with a reversible display function, was fabricated.

EXAMPLE 7

The same procedure of fabricating the optical information memory medium No. 1 of the present invention as in Example 1 was repeated except that the polycarbonate substrate employed in Example 1 was replaced by a substrate made of an acrylic resin, whereby an optical information memory medium No. 7 of the present invention, which is an optical information memory medium with a reversible display function, was fabricated.

COMPARATIVE EXAMPLE 1

The same phase-change optical disk as in Example 1 was fabricated and subjected to the same crystallization processing as in Example 1, whereby a phase-change optical disk having no reversible display function was fabricated.

In the thus fabricated optical information memory media No. 1 to No. 7 of the present invention, and comparative optical information memory medium No. 1, information was memorized in each optical information memory layer thereof, using a commercially available CD-RW drive (Trademark "MP6200S", made by Ricoh Company, Ltd.).

Part of the information, such as date and time, memorized in each optical information memory layer thereof was recorded in the reversible thermosensitive recording layer of the optical information memory media No. 1 to No. 7 in a visible form, using a recording apparatus provided with a thermal head serving as recording means, and a ceramic heater serving as erasing means, with the amount of the recording energy applied by the thermal head being adjusted in accordance with the respective recording temperatures of the reversible thermosensitive recording layers.

Furthermore, the information memorized in the optical information memory layer of each optical information memory medium was rewritten, using the above CD-RW drive, and in accordance with the rewriting of the information in the optical information memory layer of each of the optical information memory media No. 1 to No. 7 of the present invention and the comparative optical information memory medium No. 1, the visible information recorded in the reversible thermosensitive recording layer of each of the optical information memory media No. 1 to No. 7 of the present invention was erased by the ceramic heater serving as erasing means of the recording apparatus, and a new information corresponding to the rewritten information memorized in the optical information memory layer of each of the optical information memory media No. 1 to No. 7 of the present invention, was recorded in a visible form in the reversible thermosensitive recording layer.

The above rewriting test for the reversible thermosensitive recording layer was repeated 100 times for the optical information memory media No. 1 to No. 7 of the present invention, and all the recording and erasing were satisfactorily carried out.

With respect to the comparative optical information memory medium No. 1, no test was conducted with respect to the reversible thermosensitive display recording layer, since no reversible thermosensitive recording layer was provided therein.

A warp angle formed in each of the optical information memory media No. 1 to No. 7 of the present invention in the course of the rewriting of the information in each reversible thermosensitive recording layer thereof, and also a warp angle formed in the comparative optical information memory medium No. 1 in the course of the rewriting the information in the optical information memory layer thereof were measured, using a commercially available mechanical characteristics measuring apparatus (Trademark "LM-100", made by Ono Sokki Company, Ltd.).

The reading of information recorded in each of the optical information memory media No. 1 to No. 7 of the present invention and the comparative optical information memory medium No. 1 was carried out, using a signal evaluation apparatus, namely a compact disk tester (Trademark "CD-CATS", (made by Audio Development Ah.), and each of the optical information memory media was evaluated with respect to 3T Pit Jitter thereof.

It is preferable that the Jitter value be 35 ns or less. The term "Jitter" means an indefinite amount of an edge of a pit. The signals of CD can be classified into 9 types, 3T to 11T in accordance with the length of the pit thereof. Ideally, the pulse length of each pit should be in agreement with its standard length. Actually, however, each pulse length is irregular. Therefore, the position of the edge of each pit assumes a certain distribution. The difference between a standard position of the edge when the distribution is regarded as a normal distribution and an actual position of the edge is called "a deviation". The variance ($\sigma$) of the normal distribution of the position of the edge is Jitter. In the reproduction of a CD system, a clock which recognizes the data is created from a reproduction signal. From a positional relationship of the clock at the input of a signal processing circuit and a signal which passes the processing circuit, a transition point from 0 to 1, or from 1 to 0, scatters depending upon the Jitter. If the scattered transition point is generated at the rising of the clock, an error occurs. In other words, the greater the Jitter, the greater the probability of the occurrence of the error.

When the warp angle is increased, a light beam does not enter the disk in a direction perpendicular to the surface of the disk when writing is conducted, so that an appropriate amount of light cannot be applied to the recording layer. The result is that it is difficult to form appropriate pits. Furthermore, in reading recorded information from the disk, a reflected light beam is difficult to return to a pickup. Therefore, the Jitter increases in both of the above cases.

The warp angle, 3T Pit Jitter, the glass transition temperature Tg of the resin of the substrate, the recording temperature Tr, and the distance Ld between the surface of the substrate on the side of the reversible thermosensitive display recording layer and the surface of the reversible thermosensitive display recording layer of each of the above optical information memory media No. 1 to No. 7 of the present invention and the comparative optical information memory medium No. 1 are shown in the following TABLE 1:

As mentioned above, with respect to the comparative optical information memory medium No. 1, although the intermediate layer was provided, no reversible thermosensitive display recording layer was provided therein, so that as a matter of course, no heating for recording information in the reversible thermosensitive display recording layer was conducted. Therefore, only the measured 3T Pit Jitter and the glass transition temperature Tg of the resin of the substrate are shown in TABLE 1.

TABLE 1

| | Grass Transition Temperature Tg (° C.) of Resin of Substrate | Recording Temperature Tr (° C.) | Ld ($\mu$m) | Warp Angle (deg) | 3T Pit Jitter (ns) |
|---|---|---|---|---|---|
| Ex. 1 | 130 | 150 | 65 | 0.2 | 26 |
| Ex. 2 | 130 | 175 | 65 | 0.3 | 27 |
| Ex. 3 | 130 | 132 | 65 | 0.2 | 26 |
| Ex. 4 | 130 | 150 | 40 | 0.3 | 25 |
| Ex. 5 | 130 | 150 | 10 | 0.3 | 27 |
| Ex. 6 | 130 | 150 | 10 | 0.3 | 26 |
| Ex. 7 | 105 | 180 | 65 | 0.6 | 25 |
| Comp. Ex. 1 | 130 | — | — | 0.2 | 25 |

EXAMPLE 8

The same procedure of fabricating the optical information memory medium No. 1 of the present invention as in Example 1 was repeated except that in the formulation of the coating liquid for the formation of the protective layer in Example 1, one part by weight of the calcium carbonate was increased to 2 parts by weight, whereby an optical information memory medium No. 8 of the present invention, which is an optical information memory medium with a reversible display function, was fabricated.

EXAMPLE 9

The same procedure of fabricating the optical information memory medium No. 1 of the present invention as in Example 1 was repeated except that in the formulation of the coating liquid for the formation of the protective layer in Example 1, one part by weight of the calcium carbonate was replaced by 1.5 parts by weight of silica (Trademark "S-64" made by Fuji-Davison Chemical Ltd.), whereby an optical information memory medium No. 9 of the present invention, which is an optical information memory medium with a reversible display function, was fabricated.

EXAMPLE 10

The same procedure of fabricating the optical information memory medium No. 1 of the present invention as in Example 1 was repeated except that in the formulation of the coating liquid for the formation of the protective layer in Example 1, one part of the calcium carbonate was replaced by 2 parts by weight of silica (Trademark "S-244" made by Fuji-Davison Chemical Ltd.), whereby an optical information memory medium No. 10 of the present invention, which is an optical information memory medium with a reversible display function, was fabricated.

EXAMPLE 11

The same procedure of fabricating the optical information memory medium No. 1 of the present invention as in Example 1 was repeated except that from the formulation of the coating liquid for the formation of the protective layer in Example 1, the calcium carbonate was eliminated, whereby an optical information memory medium No. 11 of the present invention, which is an optical information memory medium with a reversible display function, was fabricated.

In the reversible thermosensitive display recording layer of each of the optical information memory media No. 1, and Nos. 8–11 of the present invention, character images such as date and time were recorded in a visible form, using the above-mentioned recording apparatus provided with a thermal head serving as recording means, and a ceramic heater serving as erasing means.

TABLE 2 shows the Center-line Mean Roughness (Ra) and the Ten-Point Mean Roughness (Rz) of the surface of the above optical information memory media No. 1, and Nos. 8–11 of the present invention, the uniformity of the formed images, which was visually inspected, and an image contrast between a white opaque image density and a transparent background density measured by a reflection densitometer (Macbeth RD914) of the optical information memory media No. 1, and Nos. 8–11 of the present invention.

The optical information memory media No. 10 and No. 11 exhibited inferior image uniformity and image contrast to those of the other optical information memory media No. 1, No. 8 and No. 9. It is considered that this is because the optical information memory medium No. 10 has a rougher surface, so that the thermal head cannot come into uniform contact with the surface of the optical information memory medium No. 10, and the optical information memory medium No. 11 has so smooth a surface that the movement of the thermal head relative to the optical information memory medium No. 11 cannot be smooth and the surface of the optical information memory medium No. 11 is susceptible to dust.

TABLE 2

| | Center-line Mean Roughness (Ra: $\mu$m) | Ten-Point Mean Roughness (Rz: $\mu$m) | Image Uniformity | White opaque Image Density | Transparent Background Density | Image Contrast |
|---|---|---|---|---|---|---|
| Ex. 1 | 0.20 | 1.34 | ○ | 0.27 | 1.38 | 5.1 |
| Ex. 8 | 0.27 | 1.95 | ○ | 0.26 | 1.33 | 5.1 |
| Ex. 9 | 0.52 | 2.54 | ○ | 0.25 | 1.30 | 5.2 |
| Ex. 10 | 1.12 | 3.55 | ○–Δ | 0.30 | 0.91 | 3.0 |
| Ex. 11 | 0.02 | 0.12 | Δ | 0.39 | 1.62 | 4.2 |

○: Good
Δ: Inferior
Image Contrast = Transparent Background Density/White Opaque Image Density

EXAMPLE 12

A disk as illustrated in FIG. 6 was prepared by using the optical information memory medium No. 1 of the present invention prepared in Example 1.

A mixture of the following components with the following formulation was prepared by uniformly dispersing the components and coated on part of the surface of the protective layer of the reversible thermosensitive display recording layer thereof by screen printing, and dried at 50° C. for 1 hour, so as to form a pair of 10 $\mu$m thick irreversible display recording areas made of a hydrophilic resin film, which were positioned in a center symmetry with respect to the center of the disk as illustrated in FIG. 9:

| | Parts by Weight |
|---|---|
| Polyvinyl pyrrolidone | 20 |
| polyvinyl butyral | 10 |
| Silica (Trademark: "S-244", made by Fuji-Davison Chemical Ltd.) | 10 |
| Ethanol | 60 |

Thus, an optical information memory medium No. 12 of the present invention, which is an optical information memory medium with a reversible display function, having the irreversible display recording area and the reversible display recording area, was fabricated.

In the irreversible display recording area made of the hydrophilic resin film of the optical information memory medium No. 12, a color image was formed, using a commercially available ink-jet type CD color printer (Trademark "Signature", made by FARGO Electronics, Inc.). By use of the above-mentioned recording apparatus provided with a thermal head serving as recording means, and a ceramic heater serving as erasing means, in the reversible display recording area, there was recorded in a visible form, that is, in the form of white opaque images, an information corresponding to the information which was memorized in the optical information memory layer thereof, using a commercially available CD-RW drive (Trademark "MP6200S", made by Ricoh Company, Ltd.), such as the titles of files, memorizing date and time, remaining memory capacity.

Furthermore, the information which was memorized in the optical information memory layer thereof was rewritten to a new information, using the above-mentioned commercially available CD-RW drive, and the information previously recorded in the reversible thermosensitive recording layer of the optical information memory medium No. 12 was erased to make the images transparent, using the ceramic heater serving as erasing means of the above-mentioned recording apparatus, and an information corresponding to the new information was recorded in a visible form in the reversible thermosensitive recording layer. Thus, by looting at the visible information in the reversible thermosensitive recording layer of the optical information memory medium No. 12, the information currently memorized in the optical information memory layer of the optical information memory medium No. 12 can be advantageously identified.

EXAMPLE 13

On part of the protective layer on the side of the reversible thermosensitive display recording layer of the optical information memory medium No. 1 of the present invention prepared in Example 1, a color image was formed using a thermal transfer recording type CD color printer (Trademark "Perfect Image CD Printer", made by Rimage Co.), whereby an optical information memory medium No. 13 of the present invention, which is an optical information memory medium with a reversible display function, was fabricated.

EXAMPLE 14

On part of the protective layer on the side of the reversible thermosensitive display recording layer of the optical information memory medium No. 1 of the present invention prepared in Example 1, a close contact agent layer with a thickness of 1 to 2 μm when dried was formed by coating a solution of the following components by spin coating under the conditions of high speed rotation of 350 rpm for 60 seconds:

|  | Parts by Weight |
| --- | --- |
| Polyamide resin | 5.0 |
| Toluene | 47.5 |
| Ethanol | 47.5 |

Furthermore, a solution of the following components was coated on the above close contact agent layer by spin coating under the conditions of high speed rotation of 350 rpm for 60 seconds, so that a dye receiving layer with a thickness of 2 to 3 μm when dried was formed on the close contact agent layer.

|  | Parts by Weight |
| --- | --- |
| Lipophilic clay | 4 |
| Vinyl chloride-vinyl acetate copolymer | 4 |
| Toluene | 46 |
| Methyl ethyl ketone | 46 |

Thus, an optical information memory medium No. 14 of the present invention, which is an optical information memory medium with a reversible display function, was fabricated.

A color image was formed in part of the dye receiving layer of the optical information memory medium No 14 of the present invention by sublimation type thermal image transfer recording, using an ink ribbon comprising a hydrophobic cationic dye.

By use of the above-mentioned recording apparatus provided with a thermal head serving as recording means, and a ceramic heater serving as erasing means, in the reversible display recording area, in a reversible thermosensitive display recording area where no color images were formed, of the reversible thermosensitive display recording layer of each of the above fabricated optical information memory media No. 13 and No. 14 of the present invention, there was recorded in a visible form, that is, in the form of white opaque images, an information corresponding to the information which was memorized in each optical information memory layer thereof, using a commercially available CD-RW drive (Trademark "MP6200S", made by Ricoh Company, Ltd.), such as the titles of files, memorizing date and time, remaining memory capacity. Furthermore, the information which was memorized in each optical information memory layer thereof was rewritten to a new information, using the above-mentioned commercially available CD-RW drive, and the information previously recorded in the reversible thermosensitive recording layer of each of the optical information memory media No. 13 and No. 14 was erased to make the images transparent, using the ceramic heater serving as erasing means of the above-mentioned recording apparatus, and it was possible to record an information corresponding to the new information in a visible form in each of the reversible thermosensitive recording layers of the optical information memory media No. 13 and No. 14.

Japanese Patent Application No. 09-362864 filed Dec. 12, 1997 and Japanese Patent Application No. 10-213227 filed Jul. 28, 1998 are hereby incorporated by references.

What is claimed is:

1. An optical information memory medium, comprising, in the stated order:
    (a) a substrate,
    (b) an optical information memory layer having information memorized therein, and
    (c) a reversible display recording layer having a side facing away from said optical information memory layer and having rewritably recorded therein, in a form that is visibly recognizable on said side, at least part of an information corresponding to said information memorized in said optical information memory layer.

2. The optical information memory medium as claimed in claim 1, wherein said reversible display recording layer is a reversible thermosensitive display recording layer of which transparency or color tone is thermally reversibly changeable.

3. The optical information memory medium as claimed in claim 2, wherein said substrate comprises a resin having a glass transition temperature $Tg(°C.)$, and said reversible thermosensitive display recording layer has a recording temperature $Tr(°C.)$, with said glass transition temperature $Tg(°C.)$ and said recording temperature $Tr(°C.)$ being in a relationship of:

$$Tr \leq 1.6 \times Tg \quad (1).$$

4. The optical information memory medium as claimed in claim 3, wherein said reversible thermosensitive display recording layer has a thickness $Lr$ (μm), and the distance between (a) a surface of said substrate on the side of said reversible thermosensitive display recording layer and (b) a surface of said reversible thermosensitive display recording layer on the side of said substrate is $Ld$ (μm), with said glass transition temperature Tg(° C.) of said resin, said recording temperature Tr(° C.) and said thickness Lr (μm) of said reversible thermosensitive recording layer, and said distance Ld (μm) being in a relationship of:

$$Tr \leq 1.3 \times Tg \times \frac{Lr + Ld}{Lr + 0.8 \times Ld}. \quad (2)$$

5. The optical information memory medium as claimed in claim 4, wherein said recording temperature Tr is 120° C. or more.

6. The optical information memory medium as claimed in claim 5, wherein said reversible thermosensitive display recording layer comprises an electron-donating coloring material and an electron-accepting material capable of inducing color formation in said electron-donating coloring material by a coloring reaction between said electron-donating coloring material and said electron-accepting material, and said electron-accepting material comprises at least as part of said electron-accepting material an electron-accepting compound with a melting point of 120° C. or more, but not more than 1.6 times the glass transition temperature of said resin of said substrate.

7. The optical information memory medium as claimed in claim 4, wherein said reversible thermosensitive display layer comprises a matrix resin and an organic low-molecular-weight material dispersed in said matrix resin, and has a transparency which is reversibly changeable with the application of heat thereto.

8. The optical information memory medium as claimed in claim 7, wherein said organic low-molecular-weight material comprises as at least part of said organic low-molecular-weight material an organic low-molecular-weight component with a melting point of 100° C. or more, but not more than 1.6 times the glass transition temperature of said resin of said substrate.

9. The optical information memory medium as claimed in claim 8, wherein said organic low-molecular-weight material comprises at least two organic low-molecular-weight components with different melting points with a difference of at least 30° C.

10. The optical information memory medium as claimed in claim 7, wherein said organic low-molecular-weight material comprises at least two organic low-molecular-weight components with different melting points with a difference of at least 30° C.

11. The optical information memory medium as claimed in claim 4, wherein said reversible thermosensitive display recording layer comprises an electron-donating coloring material and an electron-accepting material capable of inducing color formation in said electron-donating coloring material by a coloring reaction between said electron-donating coloring material and said electron-accepting material, and said electron-accepting material comprises at least as part of said electron-accepting material an electron-accepting compound with a melting point of 120° C. or more, but not more than 1.6 times the glass transition temperature of said resin of said substrate.

12. The optical information memory medium as claimed in claim 4, wherein said resin of said substrate has a glass transition temperature Tg of 100° C. or more.

13. The optical information memory medium as claimed in claim 4, wherein said resin of said substrate has a glass transition temperature Tg of 180° C. or less.

14. The optical information memory medium as claimed in claim 4, wherein said optical information memory medium has a warping angle of ±0.6 deg or less and a warpage of 0.4 mm or less.

15. The optical information memory medium as claimed in claim 3, wherein said recording temperature Tr is 120° C. or more.

16. The optical information memory medium as claimed in claim 15, wherein said reversible thermosensitive display recording layer comprises an electron-donating coloring material and an electron-accepting material capable of inducing color formation in said electron-donating coloring material by a coloring reaction between said electron-donating coloring material and said electron-accepting material, and said electron-accepting material comprises at least as part of said electron-accepting material an electron-accepting compound with a melting point of 120° C. or more, but not more than 1.6 times the glass transition temperature of said resin of said substrate.

17. The optical information memory medium as claimed in claim 3, wherein said reversible thermosensitive display layer comprises a matrix resin and an organic low-molecular-weight material dispersed in said matrix resin, with a transparency which is reversibly changeable with the application of heat thereto.

18. The optical information memory medium as claimed in claim 17, wherein said organic low-molecular-weight material comprises as at least part of said organic low-molecular-weight material an organic low-molecular-weight component with a melting point of 100° C. or more, but not more than 1.6 times the glass transition temperature of said resin of said substrate.

19. The optical information memory medium as claimed in claim 18, wherein said organic low-molecular-weight material comprises at least two organic low-molecular-weight components with different melting points with a difference of at least 30° C.

20. The optical information memory medium as claimed in claim 17, wherein said organic low-molecular-weight material comprises at least two organic low-molecular-weight components with different melting points with a difference of at least 30° C.

21. The optical information memory medium as claimed in claim 3, wherein said reversible thermosensitive display recording layer comprises an electron-donating coloring material and an electron-accepting material capable of inducing color formation in said electron-donating coloring material by a coloring reaction between said electron-donating coloring material and said electron-accepting material, and said electron-accepting material comprises at least as part of said electron-accepting material an electron-accepting compound with a melting point of 120° C. or more, but not more than 1.6 times the glass transition temperature of said resin of said substrate.

22. The optical information memory medium as claimed in claim 3, wherein said resin of said substrate has a glass transition temperature Tg of 100° C. or more.

23. The optical information memory medium as claimed in claim 3, wherein said resin of said substrate has a glass transition temperature Tg of 180° C. or less.

24. The optical information memory medium as claimed in claim 3, wherein said optical information memory medium has a warping angle of ±0.6 deg or less and a warpage of 0.4 mm or less.

25. The optical information memory medium as claimed in claim 2, wherein said substrate comprises a resin having a glass transition temperature Tg(° C.), said reversible thermosensitive display recording layer has a recording temperature Tr(° C.) and a thickness Lr (μm), and the distance between (a) a surface of said substrate on the side of said reversible thermosensitive display recording layer and (b) a surface of said reversible thermosensitive display recording layer on the side of said substrate is Ld ($\mu$m), with said glass transition temperature Tg(° C.) of said resin, said recording temperature Tr(° C.) and said thickness Lr ($\mu$m) of said reversible thermosensitive display recording layer, and said distance Ld ($\mu$m) being in a relationship of:

$$Tr \le 1.3 \times Tg \times \frac{Lr + Ld}{Lr + 0.8 \times Ld}. \quad (2)$$

26. The optical information memory medium as claimed in claim 25, wherein said recording temperature Tr is 120° C. or more.

27. The optical information memory medium as claimed in claim 26, wherein said reversible thermosensitive display recording layer comprises an electron-donating coloring material and an electron-accepting material capable of inducing color formation in said electron-donating coloring material by a coloring reaction between said electron-donating coloring material and said electron-accepting material, and said electron-accepting material comprises at least as part of said electron-accepting material an electron-accepting compound with a melting point of 120° C. or more, but not more than 1.6 times the glass transition temperature of said resin of said substrate.

28. The optical information memory medium as claimed in claim 25, wherein said reversible thermosensitive display layer comprises a matrix resin and an organic low-molecular-weight material dispersed in said matrix resin, and has a transparency which is reversibly changeable with the application of heat thereto.

29. The optical information memory medium as claimed in claim 28, wherein said organic low-molecular-weight material comprises as at least part of said organic low-molecular-weight material an organic low-molecular-weight component with a melting point of 100° C. or more, but not more than 1.6 times the glass transition temperature of said resin of said substrate.

30. The optical information memory medium as claimed in claim 29, wherein said organic low-molecular-weight material comprises at least two organic low-molecular-weight components with different melting points with a difference of at least 30° C.

31. The optical information memory medium as claimed in claim 28, wherein said organic low-molecular-weight material comprises at least two organic low-molecular-weight components with different melting points with a difference of at least 30° C.

32. The optical information memory medium as claimed in claim 25, wherein said reversible thermosensitive display recording layer comprises an electron-donating coloring material and an electron-accepting material capable of inducing color formation in said electron-donating coloring material by a coloring reaction between said electron-donating coloring material and said electron-accepting material, and said electron-accepting material comprises at least as part of said electron-accepting material an electron-accepting compound with a melting point of 120° C. or more, but not more than 1.6 times the glass transition temperature of said resin of said substrate.

33. The optical information memory medium as claimed in claim 25, wherein said resin of said substrate has a glass transition temperature Tg of 100° C. or more.

34. The optical information memory medium as claimed in claim 25, wherein said resin of said substrate has a glass transition temperature Tg of 180° C. or less.

35. The optical information memory medium as claimed in claim 25, wherein said optical information memory medium has a warping angle of ±0.6 deg or less and a warpage of 0.4 mm or less.

36. The optical information memory medium as claimed in claim 2, wherein said reversible thermosensitive display layer comprises a matrix resin and an organic low-molecular-weight material dispersed in said matrix resin, and has a transparency which is reversibly changeable with the application of heat thereto.

37. The optical information memory medium as claimed in claim 36, wherein said organic low-molecular-weight material comprises at least two organic low-molecular-weight components with different melting points with a difference of at least 30° C.

38. The optical information memory medium as claimed in claim 2, wherein said optical information memory medium has a warping angle of ±0.6 deg or less and a warpage of 0.4 mm or less.

39. The optical information memory medium as claimed in claim 2, further comprising a support for supporting thereon said reversible thermosensitive display recording layer and an adhesive layer or a tacky layer provided on a back side of said support opposite to said reversible thermosensitive display recording layer for fixing said reversible thermosensitive display recording layer supported on said support to said optical information memory layer, thus said adhesive layer or said tacky layer, said support and said reversible thermosensitive display recording layer constituting a reversible thermosensitive display recording label, with said reversible thermosensitive display recording label being applied to said optical information memory layer through said adhesive layer or said tacky layer.

40. The optical information memory medium as claimed in claim 2, wherein said information recorded in said reversible thermosensitive display recording layer in said visibly recognizable form is in the form of a bar code.

41. The optical information memory medium as claimed in claim 2, further comprising a light reflection layer for improving a display contrast of said reversible thermosensitive display recording layer, which light reflection layer is provided behind said reversible thermosensitive display recording layer.

42. The optical information memory medium as claimed in claim 2, further comprising a light reflection and heat dissipation layer for reflecting laser beams thereby and preventing said optical information memory layer from being heated, which light reflection and heat dissipation layer is provided between said optical information memory layer and said reversible thermosensitive display recording layer, nearer said optical information memory layer.

43. The optical information memory medium as claimed in claim 42, wherein said light reflection and heat dissipation layer serves as a light reflection layer for improving a display contrast of said reversible thermosensitive display recording layer, which is provided behind said reversible display recording layer.

44. The optical information memory medium as claimed in claim 2, wherein a top surface of said optical information memory medium on the side of said reversible thermosensitive display recording layer has a Ten-Point Mean Roughness (Rz) in a range of 0.3 to 3.0 $\mu$m (JIS B0601).

45. The optical information memory medium as claimed in claim 2, wherein a top surface of said optical information memory medium on the side of said reversible thermosensitive display recording layer has a Center-line Mean Roughness (Ra) in a range of 0.05 to 1.0 $\mu$m (JIS B0601).

46. The optical information memory medium as claimed in claim 2, further comprising a reversible thermosensitive display recording area on part of a surface of said substrate on the side of said optical information memory layer, and also an irreversible display recording area on the same surface as that of said surface of said substrate.

47. The optical information memory medium as claimed in claim 46, wherein said irreversible display recording area is a hydrophilic surface to which a water base ink can be fixed.

48. The optical information memory medium as claimed in claim 46, wherein said irreversible display recording area comprises an image receiving layer to which images formed by a thermal image transfer recording method can be fixed.

49. The optical information memory medium as claimed in claim 1, wherein said optical information memory medium has a warping angle of ±0.6 deg or less and a warpage of 0.4 mm or less.

50. The optical information memory medium as claimed in claim 1, further comprising a support for supporting thereon said reversible display recording layer and an adhesive layer or a tacky layer provided on a back side of said support opposite to said reversible display recording layer for fixing said reversible display recording layer supported on said support to said optical information memory layer, thus said adhesive layer or said tacky layer, said support and said reversible display recording layer constituting a reversible display recording label, with said reversible display recording label being applied to said optical information memory layer through said adhesive layer or said tacky layer.

51. The optical information memory medium as claimed in claim 1, wherein said information recorded in said reversible display recording layer in said visibly recognizable form is in the form of a bar code.

52. The optical information memory medium as claimed in claim 1, further comprising a light reflection layer for improving a display contrast of said reversible display recording layer, which light reflection layer is provided behind said reversible display recording layer.

53. The optical information memory medium as claimed in claim 1, further comprising a light reflection and heat dissipation layer for reflecting laser beams thereby and preventing said optical information memory layer from being heated, which light reflection and heat dissipation layer is provided between said optical information memory layer and said reversible display recording layer, nearer said optical information memory layer.

54. The optical information memory medium as claimed in claim 53, wherein said light reflection and heat dissipation layer serves as a light reflection layer for improving a display contrast of said reversible display recording layer, which is provided behind said reversible display recording layer.

55. The optical information memory medium as claimed in claim 1, wherein a top surface of said optical information memory medium on the side of said reversible display recording layer has a Ten-Point Mean Roughness (Rz) in a range of 0.3 to 3.0 μm (JIS B0601).

56. The optical information memory medium as claimed in claim 1, wherein a top surface of said optical information memory medium on the side of said reversible display recording layer has a Center-line Mean Roughness (Ra) in a range of 0.05 to 10 μm (JIS B0601).

57. The optical information memory medium as claimed in claim 1, further comprising a reversible display recording area on part of a surface of said substrate on the side of said optical information memory layer, and also an irreversible display recording area on the same surface as that of said surface of said substrate.

58. The optical information memory medium as claimed in claim 57, wherein said irreversible display recording area is a hydrophilic surface to which a water base ink can be fixed.

59. The optical information memory medium as claimed in claim 57, wherein said irreversible display recording area comprises an image receiving layer to which images formed by a thermal image transfer recording method can be fixed.

60. A display recording method, using an optical information memory medium, comprising, in the stated order: (a) a substrate, (b) an optical information memory layer which is capable of memorizing information therein, and (c) a reversible display recording layer having a side facing away from said optical information memory layer and capable of rewritably recording therein, in a form that is visibly recognizable on said side, comprising the steps of:

memorizing and/or rewriting information that can be optically read by applying a laser beam thereto in said optical information memory layer, and recording and/or rewriting, in said reversible display recording layer, at least part of an information corresponding to said information memorized in said optical information memory layer in a visibly recognizable form.

61. The display recording method as claimed in claim 60, wherein said substrate comprises a resin, and said reversible display recording layer is a reversible thermosensitive display recording layer with a transparency or a color tone thereof being thermally changeable, and at least part of said information memorized and/or recorded information in said optical information memory layer is recorded and/or rewritten in said reversible thermosensitive display recording layer with the application of heat thereto in said visibly recognizable form.

62. The display recording method as claimed in claim 61, wherein at least part of said information memorized and/or recorded information in said optical information memory layer is recorded and/or rewritten in said reversible thermosensitive display recording layer, with the application of heat thereto at a temperature which is 1.6 times or less a glass transition temperature of said resin of said substrate, in said visibly recognizable form.

63. The display recording method as claimed in claim 62, wherein said optical information memory medium further comprises a reversible display recording area on part of a surface of said substrate on the side of said optical information memory layer, and also an irreversible display recording area on the same surface as that of said surface of said substrate, further comprising a step of depositing imagewise a material comprising a dye or a pigment on said irreversible display recording area.

64. The optical information memory medium as claimed in claim 63, wherein said irreversible display recording area is a hydrophilic surface, said material comprising a dye or a pigment is a water base ink, and said water base ink is deposited imagewise on said irreversible display recording area by an ink jet printing method to form an image thereon.

65. The display recording method as claimed in claim 63, wherein said material comprising a dye or a pigment is deposited imagewise on said irreversible display recording area by a thermal image transfer method.

66. The display recording method as claimed in claim 61, wherein at least part of said information memorized and/or recorded information in said optical information memory layer is recorded and/or rewritten in said reversible thermosensitive display recording layer in said visibly recognizable form, with the application of heat thereto at a temperature corresponding to at least a temperature obtained by multiplying a glass transition temperature of said resin of said substrate by the following:

$$\frac{L3 \times (Lr + Ld)}{Lr + 0.8 \times Ld}$$

wherein Lr is the thickness (μm) of said reversible thermosensitive display recording layer, and Ld is a distance (μm) between (a) a surface of said substrate on the side of said reversible thermosensitive display recording layer and (b) a surface of said reversible thermosensitive display recording layer on the side of said substrate.

67. The display recording method as claimed in claim 66, wherein said optical information memory medium further comprises a reversible display recording area on part of a surface of said substrate on the side of said optical information memory layer, and also an irreversible display recording area on the same surface as that of said surface of said substrate, further comprising a step of depositing imagewise a material comprising a dye or a pigment on said irreversible display recording area.

68. The optical information memory medium as claimed in claim 67, wherein said irreversible display recording area is a hydrophilic surface, said material comprising a dye or a pigment is a water base ink, and said water base ink is deposited imagewise on said irreversible display recording area by an ink jet printing method to form an image thereon.

69. The display recording method as claimed in claim 67, wherein said material comprising a dye or a pigment is deposited imagewise on said irreversible display recording area by a thermal image transfer method.

70. The display recording method as claimed in claim 61, wherein said optical information memory medium further comprises a reversible display recording area on part of a surface of said substrate on the side of said optical information memory layer, and also an irreversible display recording area on the same surface as that of said surface of said substrate, further comprising a step of depositing imagewise a material comprising a dye or a pigment on said irreversible display recording area.

71. The optical information memory medium as claimed in claim 70, wherein said irreversible display recording area is a hydrophilic surface, said material comprising a dye or a pigment is a water base ink, and said water base ink is deposited imagewise on said irreversible display recording area by an ink jet printing method to form an image thereon.

72. The display recording method as claimed in claim 70, wherein said material comprising a dye or a pigment is deposited imagewise on said irreversible display recording area by a thermal image transfer method.

73. The display recording method as claimed in claim 60, wherein said optical information memory medium further comprises a reversible display recording area on part of a surface of said substrate on the side of said optical information memory layer, and also an irreversible display recording area on the same surface as that of said surface of said substrate, further comprising a step of depositing imagewise a material comprising a dye or a pigment on said irreversible display recording area.

74. The optical information memory medium as claimed in claim 64, wherein said irreversible display recording area is a hydrophilic surface, said material comprising a dye or a pigment is a water base ink, and said water base ink is deposited imagewise on said irreversible display recording area by an ink jet printing method to form an image thereon.

75. The display recording method as claimed in claim 73, wherein said material comprising a dye or a pigment is deposited imagewise on said irreversible display recording area by a thermal image transfer method.

* * * * *